US006329315B1

United States Patent
Denton et al.

(10) Patent No.: US 6,329,315 B1
(45) Date of Patent: *Dec. 11, 2001

(54) FRANGIBLE, SPRAY DRIED AGGLOMERATED SUPPORTS, METHOD OF MAKING SUCH SUPPORTS, AND OLEFIN POLYMERIZATION CATALYSTS SUPPORTED THEREON

(75) Inventors: Dean Alexander Denton, Baltimore; Michael J. Carney, Eldersburg, both of MD (US)

(73) Assignee: W. R. Grace & Co.-Conn., Columbia, MD (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/878,476

(22) Filed: Jun. 19, 1997

Related U.S. Application Data

(63) Continuation-in-part of application No. 08/667,553, filed on Jun. 21, 1996, now abandoned.

(51) Int. Cl.$^7$ .............................. B01J 21/08; B01J 23/00; B01J 23/02; B01J 21/04
(52) U.S. Cl. .................. 502/232; 502/235; 502/236; 502/238; 502/239; 502/242; 502/251; 502/256; 502/308; 502/309; 502/340; 502/341; 502/350; 502/351; 502/355; 502/407; 502/415; 502/439; 502/527.14; 502/527.16; 502/527.17
(58) Field of Search ..................................... 502/235, 236, 502/238, 239, 242, 256, 251, 308, 309, 340, 341, 350, 351, 355, 407, 415, 232, 439, 527.14, 527.16, 527.17

(56) References Cited

U.S. PATENT DOCUMENTS

| 2,288,873 | * | 7/1942 | D'Ouville | 502/251 |
| 2,470,410 | * | 5/1949 | Nelson | 502/251 |

(List continued on next page.)

FOREIGN PATENT DOCUMENTS

| A-61958/96 | 2/1997 | (AU) . |
| 4132230.4 | 9/1991 | (DE) . |

(List continued on next page.)

OTHER PUBLICATIONS

J.A. Szymura, et al., "A Novel Laboratory Slurry Reactor for Ethylene Polymerization Studies", Macromolecules, vol. 29, No. 9, Apr. 22, 1996, pp. 3103–3110, XP000581764.

*Primary Examiner*—Mark Beu
*Assistant Examiner*—Patricia L. Hailey
(74) *Attorney, Agent, or Firm*—Robert A. Maggio

(57) ABSTRACT

Frangible, spray dried agglomerate catalyst supports are provided, e.g. of silica gel, which possess a controlled morphology of microspheroidal shape, rough, scabrous appearance, and interstitial void spaces which penetrate the agglomerate surface and are of substantially uniform size and distribution. The agglomerates also possess a 1–250 micron particle size, 1–1000 m$^2$/gm. surface area, and an Attrition Quality Index (AQI) of at least 10. The agglomerates are derived from a mixture of dry milled inorganic oxide particles, e.g. silica gel, and optionally but preferably wet milled inorganic oxide particles, e.g. silica gel particles, (which preferably contain a colloidal segment of <1 micron particles) slurried in water for spray drying. The high AQI assures that the agglomerates are frangible and that polymerization performance is improved. The controlled morphology is believed to permit the constituent particles of the agglomerates to be more uniformly impregnated or coated with conventional olefin polymerization catalysts.

25 Claims, 5 Drawing Sheets

U.S. PATENT DOCUMENTS

| | | | | |
|---|---|---|---|---|
| 2,529,283 | * | 11/1950 | Corner et al. | 502/251 |
| 2,532,525 | * | 12/1950 | Webb et al. | 502/251 |
| 2,958,648 | * | 11/1960 | Braithwaite | 502/251 |
| 2,988,521 | * | 6/1961 | Innes et al. | 502/251 |
| 3,145,196 | * | 8/1964 | Engel | 502/251 |
| 3,607,777 | | 9/1971 | Winyall . | |
| 3,887,494 | | 6/1975 | Dietz . | |
| 3,965,042 | | 6/1976 | Feldwick et al. . | |
| 4,022,714 | | 5/1977 | Elliott, Jr. . | |
| 4,070,286 | | 1/1978 | Iler et al. | 210/31 C |
| 4,076,651 | | 2/1978 | Jacques . | |
| 4,105,426 | | 8/1978 | Iler et al. | 65/18 |
| 4,131,542 | | 12/1978 | Bergna et al. | 210/31 |
| 4,228,260 | | 10/1980 | Scholten et al. | 526/106 |
| 4,272,409 | | 6/1981 | Bergna . | |
| 4,460,700 | | 7/1984 | Candlin et al. | 502/104 |
| 4,548,912 | | 10/1985 | Hettinger et al. | 502/68 |
| 4,657,880 | | 4/1987 | Lachman et al. | 502/64 |
| 4,677,084 | | 6/1987 | Bergna | 502/8 |
| 4,704,374 | | 11/1987 | Jacques | 502/8 |
| 4,849,390 | | 7/1989 | Sano et al. | 502/113 |
| 4,902,666 | | 2/1990 | Rainis | 502/439 |
| 5,108,975 | | 4/1992 | Schubert et al. | 502/232 |
| 5,128,114 | | 7/1992 | Schwartz | 423/335 |
| 5,302,566 | | 4/1994 | Schwartz | 502/8 |
| 5,352,645 | | 10/1994 | Schwartz | 502/262 |
| 5,403,809 | | 4/1995 | Miller et al. | 502/413 |
| 5,426,082 | | 6/1995 | Marsden | 502/235 |
| 5,552,361 | | 9/1996 | Rieser et al. | 502/208 |
| 5,569,634 | | 10/1996 | Miller et al. | 502/64 |
| 5,589,150 | | 12/1996 | Kano et al. | 423/338 |
| 5,604,170 | | 2/1997 | Sano et al. | 502/115 |
| 5,714,424 | | 2/1998 | Warthen et al. | 502/105 |

FOREIGN PATENT DOCUMENTS

| | | |
|---|---|---|
| 0698622 | 2/1996 | (EP) . |
| 60-11718 | 1/1985 | (JP) . |
| WO 93/23438 | 11/1993 | (WO) . |
| WO 96/05236 | 2/1996 | (WO) . |
| WO 96/34062 | 10/1996 | (WO) . |

* cited by examiner

FRANGIBLE, SPRAY DRIED AGGLOMERATED SUPPORTS, METHOD OF MAKING SUCH SUPPORTS, AND OLEFIN POLYMERIZATION CATALYSTS SUPPORTED THEREON

CROSS-REFERENCE TO RELATED APPLICATIONS

This application is a continuation-in-part of U.S. patent application Ser. No. 08/667,553, filed Jun. 21, 1996, now abandoned, the disclosure of which is herein incorporated by reference.

BACKGROUND OF THE INVENTION

The present invention relates to novel agglomerate support compositions that are particularly useful for certain polyolefin polymerization catalysts. The present invention further relates to a novel method for making the agglomerate support composition and supported catalysts derived therefrom.

It is well-known that catalysts supported on a silica gel support are useful in the polymerization of olefins. The nature of the resulting polymer is highly dependent upon the catalyst, so that variations in the characteristics of the catalyst will cause variations in, for example, the molecular weight, melt index, bulk density, particle shape, particle size, particle size distribution and reaction temperature which may be employed to effect polymerization. Furthermore, the nature of the catalyst and its performance is highly dependent upon the properties of the material used to support the catalyst. The properties of the support are in turn dependent on its method of manufacture.

Using different support materials with different physical characteristics is known in the art. Agglomerated catalytic support materials and catalysts have been prepared by a variety of methods.

Some methods involve agglomeration of particles from various types of dispersions, e.g. colloidal sols, through various mechanisms, e.g. through gellation, recovering the agglomerate, and drying. Other methods employ spray drying to cause agglomeration.

For example, the following U.S. patents disclose various non-spray drying techniques for making silica containing supports: U.S. Pat. Nos. 3,887,494; 4,076,651; 4,657,880; 4,704,374; 4,849,390; 4,902,666; and 5,108,975.

Sano et al., U.S. Patent No. 4,849,390 disclose supported titanium or vanadium-containing catalysts useful for polymerizing olefins which employ a silicon and/or aluminum oxide carrier. The carrier must have a specified sphericality, average pore size (180–250 angstroms), pore size distribution (60% or more of the pores have a diameter of 100 to 300 angstroms), and breakage resistance. The breakage resistance is quantified by subjecting the particles to ultrasonic waves for two hours and measuring the resulting particle size distribution. The carrier is desirably breakage resistant if ≧50% of the particles have a particle size between 50–150 microns.

The following U.S. patents disclose spray dried silica or silica containing supports which do not employ a premilling step: U.S. Pat. Nos. 3,607,777; 3,965,042; 4,070,286; 4,105,426; 4,131,542; 4,228,260; 4,272,409; 4,460,700; 4,548,912; 4,677,084; 5,128,114; 5,302,566; 5,352,645; 5,403,809, and 5,569,634.

A number of the above patents assigned to E.I. DuPont de Nemours and Company disclose attrition resistant spray dried microspheroid agglomerates derived from colloidal particles.

More specifically, Iler et al. U.S. Pat. Nos. 4,105,426 and 4,131,542 disclose macroporous microspheroids derived from a silica sol comprising a mixture of large colloidal silica particles (average particle size (APS) 0.1 to 1 micron) and small colloidal silica particles (APS 1 to 10 nanometers) which are spray dried and sintered to convert the small colloidal silica particles to mechanically strong non-porous amorphous silica cement. The large colloidal particles of the intermediate microspheroidal powder prior to sintering are held together by the small colloidal particles. The resulting microspheroids have an average pore diameter of 0.05 to 0.5 microns.

In contrast, the microspheroids of the present invention are derived primarily from non-colloidal sized particles.

Bergna et al., U.S. Pat. No. 4,131,542 spray dries a silica sol to produce porous micrograms containing constituent particles in the 5 to 80 nanometer range which are then sintered to improve attrition resistance.

Schwartz, U.S. Pat. No. 5,128,114 (see also U.S. Pat. No. 5,352,645) discloses high strength, non-agglomerated porous microspheres of silica prepared by spray drying a mixture of an aqueous silica sol and an ammonium citrate or urea additive. The additive counteracts the tendency of the silica aquasol droplets to form an impervious crust during spray drying which, in turn, prevents the droplets from rupturing. The colloidal particles in the silica aquasol range from 5 to 100 nanometers.

Spencer et al., PCT Pub. No. WO96/05236 discloses magnesium halide supported on microspheroidal agglomerates of silica subparticles having controlled hydroxyl content. The agglomerates are characterized as possessing a void fraction of from 5 to 30 percent from cross-sectional analysis of the agglomerate by a scanning electron micrograph. However, from the figures of this publication, it can be seen that very little of the void space penetrates to the surface of the agglomerate. The only spray drying method disclosed for preparing such an agglomerate is an incorporation by reference to Winyall et al., U.S. Pat. No. 3,607,777. The preparative procedures for the samples used to generate FIGS. 1 and 2 are not disclosed, nor are the preparative procedures for the samples of Example 33. All of the agglomerated supports employed in the examples were purchased from Grace Davison under the tradename SYLOPOL®, and no preparative procedure is disclosed. Specific suitable supports mentioned are designated SYLOPOL® 948, SYLOPOL® 956, SYLOPOL® 2104, and SYLOPOL® 2212, available from Grace Davison.

Winyall et al., U.S. Pat. No. 3,607,777, discloses a preparative method which specifically avoids any milling whatsoever of the silica gel.

Sato et al. Japanese Patent Pub. 61-174103 discloses a process for producing porous spherical fine powders having an average particle size of 1 to 20 microns by spray drying a mixture of a colloidal oxide sol (10–95 parts) and inorganic oxide gel (5–90 parts). However, while the average particle size of the colloidal sol particles are less than 2,500 Angstroms, the average particle size of the gel is also in the colloidal range of less than 1 micron.

Miller et al., U.S. Pat. No. 5,569,634 discloses the preparation of porous bodies suitable for use as a catalyst support but primarily as a biocarrier, which bodies are derived from the extrusion, pelletization, balling, or granulating of ultimate particles and optional binder. The ultimate particles comprise inorganic oxide particles (which must contain at least some zeolite) of 1–1000 microns. The preferred inorganic oxide is clay (i.e., natural or synthetic hydrated aluminosilicates). The binder for the ultimate particles can be silica. The ultimate particles can be formed by spray drying a mixture of clay, zeolite, and optional binder.

The ultimate particles must possess a requisite physical integrity or they will be crushed, deformed, or attrited during the formation of the porous body. A Davison Index for attrition is disclosed which is similar to the AQI test (described hereinafter in greater detail), but much more severe, e.g., it uses an air flow rate of 21 liters per minute (AQI flow rate=9 liters/min.), for 60 minutes (AQI test=30 min.). Moreover, the Davison Index test uses a 0–20 micron base line, rather than the 0–16 micron base line of the AQI test. Suitable Davison Index values for the ultimate particle are disclosed to be 70 or less. Thus, the ultimate particle is merely an intermediate in the formation of the porous body, and the morphology of the ultimate particle is not disclosed. The use of silica gel or the milling thereof to prepare the inorganic oxides for spray drying is not disclosed.

The following patents disclose spray drying of silica supports and employ premilling of a silica gel: U.S. Pat. Nos. 5,589,150 and 5,604,170; PCT Publication Nos. WO96/34062 and WO 93/23438; and German Patent Application No. DE 41 332 30.4.

More specifically, Kano et al., U.S. Pat. No. 5,589,150 discloses a method for preparing spherular silica gel particles wherein a hydrosol is allowed to congeal to a hydrogel. This hydrogel is filtered, slurried and rinsed, and mixed with demineralized water, the filtrate adjusted to a pH of 1–10 with ammonia, and the slurry thermally treated for 1 to 50 hours at 50 to 200° C. The resulting thermally treated silica hydrogel is then filtered and coarsely ground using an impact mill to a particle diameter of 100–200 microns. The coarsely ground particles are then slurried in water to a predetermined moisture content such that the weight ratio of water:silica hydrogel in the slurry is 0.2:1 to 1.5:1. Control of the moisture content is deemed critical, inter-alia, to obtain sufficiently high particle strength. The resulting slurry is then wet milled to reduce the particle size to between 1 and 50 microns. The wet milled slurry is then spray dried at various different solids and pH combinations reported in the examples, i.e., a pH of 8.5 and moisture ratios of 0.75 to 1.33 for embodiments 1–3, and a pH of 2.0 and moisture ratios of 0.35 to 0.45 for embodiments 4–6.

However, Kano et al. fail to disclose a step involving dry milling of a powder or the use of a wet milled silica hydrogel containing minimum amounts of colloidal size particles which function as a binder in the presently claimed invention. Moreover, it is clear that Kano et al. seek to form agglomerates having a high particle strength in contrast to the presently claimed invention which seeks to form agglomerates having a sufficiently low particle strength, expressed by AQI, that they will break apart during polymerization. Kano et al. also fail to disclose anything about the surface texture and void space of the agglomerate. Without wishing to be bound by any particular theory, such factors are believed to significantly influence the degree of deposition of the catalytic components within the agglomerate, as described hereinafter in greater detail.

Sano et al. U.S. Pat. No. 5,604,170 discloses the use of an oxide support of silicon or aluminum having 5 different property types of average particle size (20–150 microns), specific surface area (150–600 m$^2$/g), pore volume distribution (0.3 to 2.0 cm$^3$/g for 18 to 1000 Angstrom pore radius) specific gravity ($\geq$0.32), and degree of resistance to ultrasonic disintegration to 50 microns or smaller particle size, of not more than 30% for samples classified between 53 and 75 microns. Only wet milling of coarsely pulverized particles (using a hammer mill) is disclosed.

Belligoi et al. PCT Publication No. WO96/34062 discloses aggregated silica gel made by spray drying a mixture of micronized silica gel and a binding agent selected from phyllosilicate, pyrogenic silicon dioxide and water soluble organic polymers. The resulting product is employed as a matting agent or blocking agent and not as a catalyst support.

In contrast, the preferred embodiments of the present invention rely on colloidal components of a milled silica gel as the binder for non-colloidal constituents of the agglomerate. Any organic polymer would be destroyed upon calcination of the support for use as a polymerization catalyst. Belligoi et al. do not employ calcination. More importantly, Belligoi et al. seek to form a stable aggregate to withstand shear forces during dispersion of the matting agent into paint (pg. 4, line 26 et seq.). This stability is accomplished with the binding agent which is intended to exert a much greater binding effect than the colloidal constituents, when present, of the milled particles of the present invention wherein the binding effect is merely to hold the agglomerate together for handling. In the present invention, upon use as a polymerization catalyst, the binder must release the constituent particles and permit the agglomerate to break apart. Belligoi et al. also fail to disclose a wet milling step in combination with a dry milling step. However, they do employ SYLOID® 244 which, although not known, is a milled powder.

Marsden, PCT Publication No. WO93/23438 discloses porous microspherical cogel particles comprising silica and at least one other metal oxide derived by spray drying from a liquid medium comprising at least 90 weight percent organic liquid. While the cogel is wet milled down to a 1 to 60 micron average particle size, the wet milling is performed in an organic medium. No dry milling of a powder is disclosed.

U.S. Pat. No. 5,552,361 discloses a process for making aluminum phosphate microspherical particles with a bimodal pore size distribution. An aluminum phosphate hydrogel is wet milled to a particle size of less than 10 microns and the slurry spray dried at a pH of 3 to 7 and a solids content of 10–13 weight percent to produce agglomerates having a particle size of 10 to 250 microns.

DE 41 322 30.4 discloses a spherical silica gel made by the sol-gel process for use as a matting agent in paints. The sol-gel is crushed without water loss to about a 10 micron median particle size, and the crushed silicon dioxide resuspended in water for spray drying. Thus, the disclosed process does not employ a dry milling of powder step. The resulting material has increased abrasion resistance. Neither the AQI nor the pH of the spray drying are disclosed.

Thus, there has been a continuing search for catalyst supports which are easy to handle and which improve the catalyst performance in polymerizing olefins. The present invention was developed in response to this search.

SUMMARY OF THE INVENTION

As can be seen from the above, a goal in virtually all instances involving agglomerated supports is to increase or maximize a property of the agglomerate, variously referred to as crush strength, attrition resistance, mechanical strength or the like.

In contrast, the present invention relies on the discovery that advantages are achievable by controlling the morphology of the agglomerate such that an intrinsic frangibility is imparted thereto which causes the agglomerate to break apart in a controlled manner during use as an olefin polymerization catalyst support.

One advantage realized by controlling agglomerate morphology is a significant change in the activity and/or the polymerization kinetic profile (as measured by the uptake of ethylene, e.g., the catalyst activity is very high, even at the beginning of the polymerization reaction) of a catalyst supported on such structures. Other advantages include the possession of interstitial void spaces or channels which penetrate from the agglomerate surface to the agglomerate interior. While not wishing to be bound by any particular theory, it is believed that such void spaces or channels render the agglomerate capable of more readily accepting the deposition of catalyst within such channels in a more uniform manner. Still further benefits include an increase in the ease of handling the agglomerated particles, and the production of smaller, more numerous particles having a narrow particle size distribution when the agglomerate breaks apart. More specifically, the absence of large constituent particles in the agglomerate can improve resin film appearance. The presence of large, unfractured support particles in thin polymer films are understood to give rise to undesirable imperfections, commonly referred to as "fish eyes".

The frangibility or attritability of the agglomerate particles is characterized by a property referred to herein as the Attrition Quality Index (AQI). This property is a number which expresses the difference between the percentage of particles of a sample having a particle size less than some predetermined size, e.g. 16 microns, after being subjected to stress impact, and the percentage of particles of the same sample having the same predetermined particle size, e.g. below 16 microns, before stress impact.

It has been discovered that a direct proportional relationship exists between catalyst activity and the AQI of an agglomerate employed to support certain catalysts, i.e., the higher the AQI, the higher the catalyst activity within certain limits. This relationship applies particularly to Ziegler-Natta catalysts.

Ziegler-Natta catalysts are sensitive to water and become deactivated if exposed to the same. Consequently, these materials typically cannot be admixed with silica hydrogel containing slurry prior to spray drying. The Ziegler-Natta catalysts must therefore be applied to the support after spray drying. While the slurry could be made with an organic liquid to carry the Ziegler-Natta catalyst, this complicates the process because the organic liquid typically is expensive, flammable, hazardous, and otherwise not conducive to spray drying. The supports of the present invention are believed to be particularly adapted for impregnation with the Ziegler-Natta catalyst components.

More specifically, it is generally accepted that one catalyst particle gives rise to one resin particle. However, without wishing to be bound by any particular theory, in the present invention the monomer is believed to penetrate the interior of the agglomerate particle where it begins to polymerize. As the growing polymer chain exerts stress on the agglomerate, the latter fractures in a controlled manner and expands to accommodate the polymer. Therefore, each of the constituent particles is eventually enveloped by the polymer expansion. The more frangible supports of the present invention require less internal stress to fracture, and therefore permit the polymer to accumulate faster. The initial form of the catalyst support as microspheroidal agglomerates is of considerable benefit for handling purposes during transportation and/or catalyst impregnation.

Accordingly, in one aspect of the present invention there is provided frangible catalyst support agglomerate particles comprising spray dried inorganic oxide selected from the group consisting of $SiO_2$, $Al_2O_3$, MgO, $AlPO_4$, $TiO_2$, $ZrO_2$, $Cr_2O_3$, and mixtures thereof, wherein:

(A) at least 80% of the volume of the agglomerated particles smaller than the $D_{90}$ of the original agglomerate particle size distribution possesses a microspheroidal morphology;

(B) the microspheroidal support agglomerate particles possess:
  (i) a surface having a rough, scabrous appearance;
  (ii) interstitial void spaces having a substantially uniform size and distribution within said agglomerate, with at least some of the interstitial void spaces penetrating the agglomerate particle surface thereby providing at least 10 channels from the agglomerate surface to the agglomerate particle interior; and
  (iii) an average Interstitial Void Space (IVS) of from about 15 to about 40%;

(C) the support agglomerate particles possess:
  (i) an average particle size in the range of about 1 to about 250 microns;
  (ii) a surface area of from about 1 to about 1000 $m^2$ per gram; and
  (iii) an AQI of greater than about 10; and (D) the constituent particles from which the agglomerate support particles are derived have an average particle size, prior to spray drying, of from about 3 to about 10 microns.

In a further embodiment there is provided a method for preparing frangible catalyst support agglomerate particles which comprises:

(A) dry milling inorganic oxide selected from the group consisting of $SiO_2$, $Al_2O_3$, MgO, $AlPO_4$, $TiO_2$, $ZrO_2$, $Cr_2O_3$, and mixtures thereof, in a manner and under conditions sufficient to form powder having an average particle size of from about 2 to about 10 microns and a moisture content of less than about 50% by weight, based on the powder weight;

(B) optionally, wet milling an aqueous slurry of inorganic oxide selected from the group consisting of $SiO_2$, $Al_2O_3$, MgO, $AlPO_4$, $TiO_2$, $ZrO_2$, $Cr_2O_3$, and mixtures thereof, in a manner and under conditions sufficient to impart an average particle size of from about 3 to about 10 microns, and a particle size distribution such that from about 4 to about 40 weight % of the solid material possesses a colloidal particle size;

(C) providing an aqueous slurry comprising a dry milled powder solids prepared in accordance with step (A), and optionally wet milled solids prepared in accordance with step (B);

(D) controlling, in the slurry of (C), the wet milled:dry milled component dry solids weight ratio, the total weight % solids, and the slurry pH in a manner sufficient to produce catalyst support agglomerate particles possessing the below described properties, when the slurry is spray dried; and (E) spray drying the slurry of (C) having controlled weight % solids, pH, and component solids ratio in a manner and under conditions sufficient to produce catalyst support agglomerate particles having the following properties:
  (i) at least 80% of the volume of the agglomerated particles smaller than the $D_{90}$ of the original agglomerate particle size distribution possesses a microspheroidal morphology; and, (ii) the microspheroidal support agglomerate particles possess:
  (a) a surface having a rough, scabrous appearance;
  (b) interstitial void spaces having a substantially uniform size and distribution within said agglomerate with at least some of the interstitial void spaces penetrating the agglomerate surface thereby providing at least 10 channels from the agglomerate surface to the agglomerate particle interior;
(iii) an average IVS of from about 15 to about 40%;
(iv) the support agglomerate particles possess:
  (a) an average particle size in the range of about 1 to about 250 microns;
  (b) a surface area of from about 1 to about 1000 $m^2$ per gram; and
  (c) an AQI of greater than about 10.

In a still further embodiment of the present invention there is provided the aforedescribed catalyst support which has been impregnated with at least one component of a catalyst system capable of polymerizing olefins.

Figure 1:
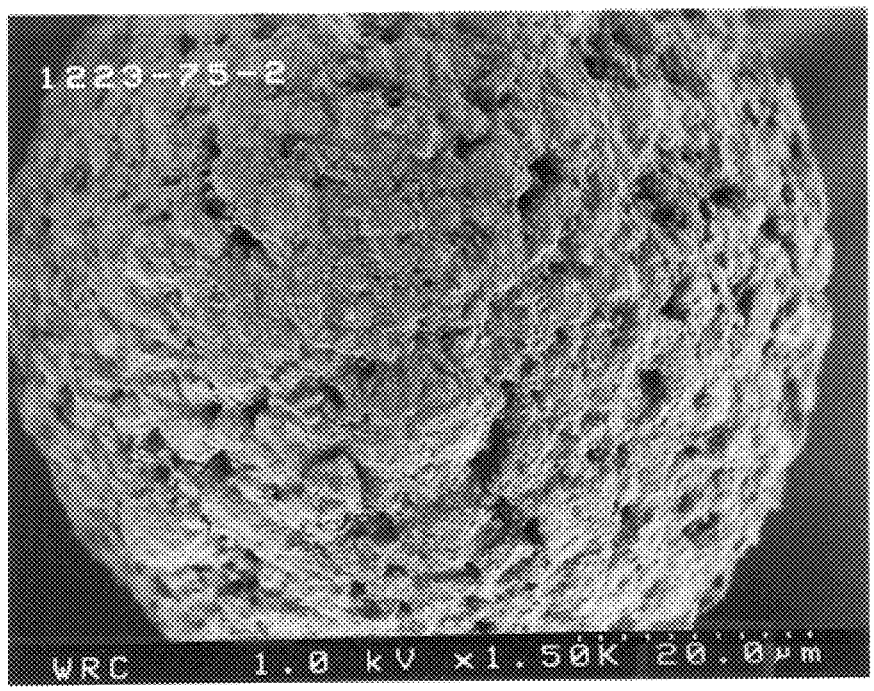
FIG. 1 is an electron micrograph of an agglomerate particle prepared in accordance with Example 4, Run No. 16. The photograph was taken with a scanning electron microscope and represents a 1,500-fold magnification of the actual agglomerate particle.

All electron micrographs were generated using a Hitachi S4500 cold field scanning electron microscope using a beam accelerating voltage of 1.0 kV. For cross-sectioning, the support particles were embedded in Strures cold mount EPO-fix resin and HQ hardener and allowed to cure overnight in a desiccator. Cross-sections were obtained by cutting through several of the mounted support particles using a Buehler diamond saw and then grinding and polishing with 320 grit silicon carbide, 1.0 $\mu$m and 0.05 $\mu$m alpha alumina powder. The polished particles were then sonicated in freon for 10 min. and then placed in a Edwards 306 carbon coater where a thin film of carbon (3.0 nm) was vapor deposited onto the polished surface of the particles.

DESCRIPTION OF PREFERRED EMBODIMENTS

The catalyst support agglomerate particles of the present invention are derived from porous inorganic oxides including $SiO_2$, $Al_2O_3$, $AlPO_4$, $MgO$, $TiO_2$, $ZrO_2$; mixed inorganic oxides including $SiO_2.Al_2O_3$, $MgO.SiO_2.Al_2O_3$, $SiO_2.TiO_2.Al_2O_3$, $SiO_2.Cr_2O_3$, and $SiO_2.Cr_2O_3.TiO_2$ based on the weight of the catalyst support. Where the inorganic oxide (including mixed inorganic oxides) is capable of forming a gel by known commercial procedures, it is preferred to utilize the same in a gel configuration for the milling procedures described herein. If the inorganic oxide is not susceptible to gel formation, the free oxide or mixed oxides derived from other conventional techniques such as precipitation, coprecipitation, or just admixing, can be utilized directly for the milling procedures after washing.

The most preferred supports contain typically at least 80, preferably at least 90, and most preferably at least 95%, by weight, silica gel (e.g., hydrogel, aerogel, or xerogel) based on the weight of the catalyst support.

Silica hydrogel, also known as silica aquagel, is a silica gel formed in water which has its pores filled with water. A xerogel is a hydrogel with the water removed. An aerogel is a type of xerogel from which the liquid has been removed in such a way as to minimize any collapse or change in the structure as the water is removed.

Silica gel is prepared by conventional means such as by mixing an aqueous solution of an alkali metal silicate (e.g., sodium silicate) with a strong acid such as nitric or sulfuric acid, the mixing being done under suitable conditions of agitation to form a clear silica sol which sets into a hydrogel in less than about one-half hour. The resulting gel is then washed. The concentration of the $SiO_2$ in the hydrogel which is formed is usually in the range of typically between about 15 and about 40, preferably between about 20 and about 35, and most preferably between about 30 and about 35 weight percent, with the pH of that gel being from about 1 to about 9, preferably 1 to about 4. A wide range of mixing temperatures can be employed, this range being typically from about 20 to about 50° C.

Washing is accomplished simply by immersing the newly formed hydrogel in a continuously moving stream of water which leaches out the undesirable salts, leaving about 99.5 w% pure silica ($SiO_2$) behind.

The pH, temperature, and duration of the wash water will influence the physical properties of the silica, such as surface area (SA) and pore volume (PV). Silica gel washed at 65–90° C. at pH's of 8–9 for 28–36 hours will usually have SA's of 290–350 and form aerogels with PV's of 1.4 to 1.7 cc/gm. Silica gel washed at pH's of 3–5 at 50–65° C. for 15–25 hours will have SA's of 700–850 and form aerogels with PV's of 0.6–1.3.

When employing supports containing at least 80 w% silica gel, the remaining balance of the catalyst support can comprise various additional components. These additional components may be of two types, namely (1) those which are intimately incorporated into the gel structure upon formation, e.g., by cogelling silica gel with one or more other gel forming inorganic oxide materials, and (2) those materials which are admixed with silica gel particles prior to milling or after milling in slurry form just prior to spray drying. Thus, materials includable in the former category are silica-alumina, silica-titania, silica-titania-alumina, and silica-aluminum phosphate cogels.

In the latter category, components which may be admixed, in slight proportions, with the silica hydrogel particles prior to milling and/or just prior to spray drying include those prepared separately from inorganic oxides such as magnesium oxide, titanium oxide, thorium oxide and oxides of Groups IIA and VIA, as well as other particulate constituents.

Other particulate constituents which may be present include those constituents having catalytic properties, not adversely affected by water, spray drying or calcination, such as divided oxides or chemical compounds, recognizing, however, that these constituents play no part in the agglomeration procedure. Similarly, it is possible to add powders or particles of other constituents to the silica hydrogel particles to impart additional properties to the support obtained. Accordingly, in addition to those powders or particulates having catalytic properties, there may be added materials which possess absorbent properties, such as synthetic zeolites.

Thus, it is possible to obtain complex catalyst supports wherein amorphous silica gel contains crystallizable elements and the like. The skilled artisan will appreciate that the amounts of such additional components must be restricted in order to avoid compromising the desired agglomerate properties described herein.

Also, it is feasible to add constituents to the inorganic oxide which may be eliminated after spray drying in order to control porosity within a desired range; such agents as sulfur, graphite, wood charcoal, and the like being particularly useful for this purpose.

When non-silica gel components are to be employed with silica gel, they may be added to the slurry to be spray dried. However, it is preferable that they be present in the silica gel during or prior to milling as described hereinafter, since they will be less likely to disturb the desired agglomerate morphology after spray drying when they are also subjected to milling.

In view of the above, the term "silica gel", when used to describe the process steps up to and including spray drying, is intended to include the optional inclusion of the aforementioned non-silica gel constituents permitted to be present in the catalyst support.

The inorganic oxide(s), e.g. silica gel, resulting after water washing will typically be present as nodules with about a ¼ inch (0.65 cm) average diameter.

To render the inorganic oxide(s) suitable for spray drying, various milling procedures are employed. The goal of the milling procedure is to ultimately provide the inorganic oxide(s) to be spray dried with an average particle size of typically from about 3 to about 10, preferably from about 4 to about 9, and most preferably from about 4 to about 7 microns. Desirably the milling procedures will also impart a particle size Distribution Span to the particles in the slurry to be spray dried of typically from about 0.5 to about 3.0, and preferably from about 0.5 to about 2.0. The particle size Distribution Span is determined in accordance with the following equation.

$$\text{Distribution Span} = \frac{D_{90} - D_{10}}{D_{50}} \qquad \text{Equation 1}$$

Wherein $D_{10}$, $D_{50}$, and $D_{90}$ represent the 10th, 50th, and 90th percentile, respectively, of the particle size (diameter) distribution, i.e. a $D_{90}$ of 100 microns means that 90 volume % of the particles have diameters less than or equal to 100 microns. Still more preferably, the milling is conducted to impart a particle size distribution to the inorganic oxides in the slurry to be spray dried such that its colloidal content is typically from about 2 to about 40 (e.g. 4 to about 40), preferably from about 3 to about 25, and most preferably from about 4 to about 20 weight % of the inorganic oxide.

The colloidal content of the slurry to be spray dried is determined by centrifuging the sample for 20 minutes at 3600 RPM. The liquid which remains on top of the test tube is decanted, weighed and analyzed for % solids. This quantity of material, divided by the total solids present (both particulate and colloidal), represents the colloidal content of the slurry. The colloidal content will possess a particle diameter in the colloidal range of typically less than about 1, preferably less than about 0.5, and typically from about 0.4 to about 1 micron.

All particle size and particle size distribution measurements described herein are determined by a Mastersizer unit from Malvern, which operates on the principle of laser light diffraction and is known to all familiar in the art of small particle analysis.

It is important that the colloidal content of the dry solids content of the slurry not exceed about 40 weight %, otherwise the constituent particles of the agglomerate may be bound too tightly together and will not possess the desired interstitial void space.

Conversely, while the presence of at least some colloidal content of the slurry is desired, it has been found that a slurry containing only dry milled powder (which has essentially no colloidal content) can be spray dried and the resulting agglomerates will still possess sufficient physical integrity that they can be employed as a support for a polymerization catalyst. However, under such circumstances and from a practical standpoint, it is desirable that the average particle size of the dry milled powder be located toward the low end of the 3 to 10 micron range, e.g. between about 3 and about 5 microns. By controlling the average particle size of the dry milled powder in this fashion, one increases the probability that the compressive forces exerted on the constituent particles during spray drying will be high enough to cause them to adhere (although loosely) to each other, even in the absence of colloidal particles.

The milling procedure which has been found to impart the aforedescribed properties, as well as the desired morphology, involves a dry milling procedure, and optionally, a wet milling procedure.

A dry milling procedure is characterized by the substantial absence of the presence of free flowing liquid, e.g. water or solvent. Thus, while the final dry milled material may contain some adsorbed moisture, it is essentially in powder form, not a suspension or solution of particles in liquid.

The dry milling referred to typically takes particulate inorganic oxide and reduces it in size either by mechanical action, impingement onto a metal surface, or collision with other particles after entrainment into a high-velocity air stream.

A wet milling procedure is characterized by the presence of liquid, e.g. water, during the milling procedure. Thus, wet milling is typically performed on a slurry of the inorganic oxide particles having a solids content of typically from about 15 to about 25 weight percent based on the slurry weight.

More specifically, with wet milling, the inorganic oxide is slurried in a media (usually water) and the mixture then subjected to intense mechanical action, such as the high speed metal blades of a hammer mill or rapidly churning media of a sand mill. Wet milling reduces particle size and produces colloidal silica as well.

Accordingly, the inorganic oxide (typically while still wet) is then subjected to a milling operation as described below to prepare it for spray drying.

In the dry milling procedure, the inorganic oxide is milled in a manner sufficient to reduce its average particle size to typically from about 2 to about 10, preferably from about 3 to about 7, and most preferably from about 3 to about 6 microns, and its moisture content to typically less than about 50, preferably less than about 25, and most preferably less than about 15 weight percent. In order to attain the dry milling particle size targets at the higher moisture contents, it may be necessary to conduct dry milling while the particles are frozen.

The dry milling is also conducted to preferably impart a particle size distribution such that the Distribution Span is typically from about 0.5 to about 3.0, preferably from about 0.5 to about 2.0, and most preferably from about 0.7 to about 1.3.

Thus, the resulting dry milled material exists in the form of a powder prior to being slurried for spray drying.

The dry milling is preferably conducted in a mill capable of flash drying the inorganic oxide while milling. Flash drying is a standard industrial process where the material to be dried is quickly dispersed into a hot air chamber and exposed to an air stream of 370–537° C. The rate of air and material input is balanced such that the temperature of the outgoing air and the material entrained in it is generally 121–176° C. The whole process of drying usually takes place in less than 10 seconds, reducing the moisture content to less than about 10%. Alternatively, the inorganic oxide can be separately flash dried to the aforedescribed moisture content in a flash dryer and then placed in a dry mill and milled. Suitable dry mills include an ABB Raymond™ impact mill or an ALJET™ fluid energy mill. Ball mills can also be used. Suitable flash drying equipment includes Bowen™ flash dryer. Other similar equipment is well known in the chemical processing industry.

Flash drying is typically accomplished by exposing the inorganic oxide to conditions of temperature and pressure sufficient to reduce the moisture content thereof to levels as described above over a period of time of typically less than about 60, preferably less than about 30, and most preferably less than about 5 seconds.

Dry milling typically does not produce colloidal silica.

In the wet milling procedure, the washed inorganic oxide is typically subjected to a milling procedure well known in the art that is necessary to produce slurries with the particle sizes specified above. Suitable mills include hammer mills, impact mills (where particle size reduction/control is achieved by impact of the oxide with metal blades and retained by an appropriately sized screen), and sand mills (where particle size control/reduction is achieved by contact of the oxide with hard media such as sand or zirconia beads).

The colloidal particles within the wet milled material is the primary source of the colloid content in the slurry to be spray dried as described above, and is believed to act as a binder upon spray drying.

In accordance with the present invention, at least a portion of the material to be spray dried is derived from dry milling, and preferably a portion is derived from wet milling. Thus, the material to be spray dried will typically contain a mixture of previously dry milled inorganic oxide, e.g. silica gel powder, and wet milled inorganic oxide, e.g. silica gel. More specifically, the weight ratio (on a dry solids content basis as defined hereinafter) of the wet milled:dry milled inorganic oxide solids in the slurry can vary typically from about 9:1 to about 0:1 (e.g., 0.01:1), preferably from about 1.5:1 to about 0.1:1, and most preferably from about 0.6:1 to about 0.25:1.

The particular wet milled:dry milled solids ratio employed will be selected to achieve the target properties in the final slurry to be spray dried.

Once the inorganic oxide is milled to impart the target average particle size and preferably the particle size Distribution Span, a slurry, preferably aqueous slurry, is prepared for spray drying.

The dry milled material can be separately slurried and the two slurries combined, or the dry milled powder can be added to the wet milled slurry and the solids adjusted.

Overall, the spray drying is conducted under conditions sufficient to produce agglomerated catalyst support particles having a particular morphology, average particle size, surface area, and AQI.

In preparing the slurry to be spray dried, the pH and solids content of the slurry are the properties which have the most significant impact on the target properties of the spray dried product. The particular pH and solids content selected will depend on the milling history to which the inorganic oxide has been subjected.

The dual milling procedures described above permit one to control the morphology of the spray dried product to impart a particular agglomerate shape, surface texture, and interior void space.

More specifically, the spray dried product is characterized in that typically at least 80, preferably at least 90, and most preferably at least 95 volume % of that fraction of the support agglomerate particles smaller than the $D_{90}$ of the original agglomerate particle size distribution possesses microspheroidal shape (i.e., morphology). Evaluation of the microspheroidal morphology is performed on that fraction of the particle size distribution of the support agglomerates which is smaller than the $D_{90}$ to avoid distortion of the results by a few large particle chunks which because of their large volume, would constitute a non-representative sample of the agglomerate volume. The term "agglomerate" refers to a product that combines particles which are held together by a variety of physical-chemical forces. The term "spheroidal" as used herein means small particles of a generally rounded, but not necessarily spherical shape. This term is intended to distinguish from irregular jagged chunks and leaf or rod like configurations. "Spheroidal" is also intended to include polylobed configurations wherein the lobes are also generally rounded, although polylobed structures are uncommon when the agglomerate is made as described herein.

Thus, each microspheroid is composed of a plurality of contiguous, non-colloidal constituent primary particles sized as described above in connection with the description of the slurry preparation, preferably joined and connected at their points of contact by what is believed to be remnant material derived from the colloidal segment of the wet milled material present in the slurry solids which are spray dried.

In addition, spray drying is controlled to impart a rough, scabrous appearance to the agglomerate particles. The rough, scabrous appearance is believed to be attributable, at least in part, to interstitial void spaces within the agglomerate which commence at the surface of the particle and penetrate the skin of the agglomerate as channels which descend into the interior of the agglomerate. These interstitial void spaces are the channels formed by loosely packed constituent primary particles and, when present, secondary colloidal particle constituents which hold the agglomerate together prior to use as a polymerization catalyst, but are not numerous enough to fill the void spaces.

The interstitial void space between the constituent particles can be quantified by the percent of Interstitial Void Space (IVS). The percent IVS as used in the present invention is determined from electron micrographs of cross-sections of support particles in accordance with the following equation:

$$\% \ IVS = \left[1 - \left(\frac{\text{Area of Solid Support}}{\text{Total Area of Solid Support}}\right)\right] 100 \quad \text{Equation 2}$$

Wherein the "Area of Solid Support" represents the area of particles occupied by solid support in a cross-sectioned view thereof and "Total Area of Solid Support" is the area occupied by solid support particles, including interstitial void space.

The images used for IVS determination are acquired using backscattered electrons.

More specifically, samples are prepared by mounting several particles from each preparation in epoxy resin. Once the epoxy resin has cured, the mounted sample blocks are ground and polished until the internal matrix of several particles in both samples are exposed and possess a 1.0 μm smooth surface. The surface of the polished sample is then coated with a thin coating (~50 Å thick) of carbon to provide a conductive surface for the electron beam. Backscattered electron images (BSE) are then obtained of several particles in each sample using a Cameca SX50 electron probe microanalyzer (EPMA) using a beam current of 20 nm with a 25 kV accelerating voltage. The BSE images are directly stored on disk using Princeton Gamma Tech (FGT) image storing software and converted into binary images using a PGT image analyzer where the Area of Solid Support and Total Area of Solid Support are determined for several different particles in the sample and the results averaged.

The average IVS of the agglomerate particles of the present invention can vary typically from about 15 to about 40, preferably about 20 to about 35, and most preferably about 20 to about 30% (e.g. 25%).

While not wishing to be bound by any particular theory, it is believed that not only must interior void space exist, but it should penetrate the surface of the microspheroid, preferably frequently, in order to facilitate penetration of the catalyst species within the interior of the agglomerate during impregnation. Such surface penetrations or channels will average typically at least 10, preferably at least about 25, and most preferably at least about 30, on that part of the surface of the agglomerate particle which is visible in an electron micrograph at 1500× magnification, and can range typically from about 10 to about 50, preferably from about 20 to about 50, and most preferably from about 25 to about 50.

A further way of characterizing the interior void space of the agglomerates of the present invention is that it is substantially uniform in size and distribution within the agglomerate. More specifically, microspheroids with an empty center are undesired, as are relatively large asymmetric regions of void space within the microspheroid. This stems from the fact that the desired void space is believed to be attributable to interconnecting interstitial spaces between the primary constituent particles of the microspheroid. Since the method of the present invention produces constituent particles having a narrow particle size distribution (leading to more uniform distribution of such particles within the agglomerate), and the colloidal binder particles, when present, are present in restricted amounts to avoid plugging such interstitial spaces, the void spaces produced by such sub-particles are desirably also uniformly distributed between the uniformly distributed constituent particles. In short, the uniform distribution of narrowly sized particles within the agglomerate leads to uniformly distributed void spaces between such particles which are substantially similar in size. While not wishing to be bound by any particular theory, it is believed that the uniformity of the void space size and distribution affects the uniformity of deposition of the catalyst species within the agglomerate upon impregnation.

Characterization of the aforedescribed aspects of the void space, namely, (1) degree of penetration to the surface, and (2) degree of uniformity of size and distribution of the void space within the agglomerate particle is difficult to express on a quantitative, objective, basis.

Figure 5:
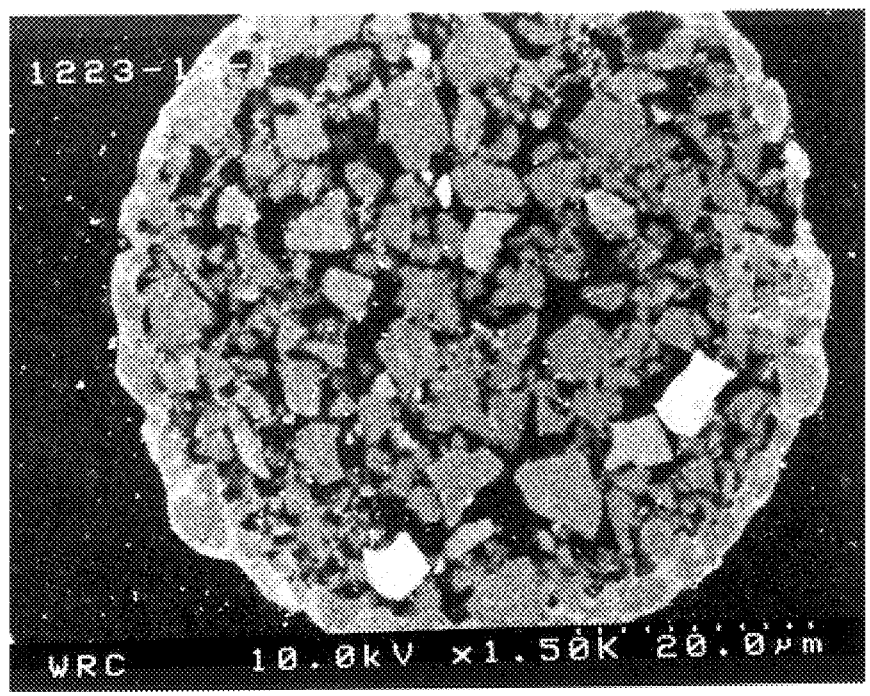
FIG. 5 is an electron micrograph of a cross-section of an agglomerate particle prepared in accordance with Example 4, Run No. 18. The photograph was taken with a scanning electron microscope and represents a 1,500-fold magnification of the actual agglomerate.

However, referring to FIG. 5, it can be seen from a cross-sectional view of the particles produced by the present invention that each discrete 2-dimensional depiction of the void space is similar in diameter to the sub-particles contiguous to the same, and that such spaces are both relatively evenly distributed and of relatively uniform size. Similarly, referring to FIG. 1, it can be seen that numerous holes or channels are present on the surface of the agglomerate particle relative to FIG. 3. It is the presence of these surface holes or channels which induces the scabrous appearance of the agglomerate particles.

Accordingly, by substantially uniform size of the interstitial void space is meant that the diameter of the void spaces observed in a cross-sectional view of the agglomerates under a scanning electron micrograph, at a 1500× magnification, are within ±25%, preferably within ±15% of the diameter of the constituent particle cross-sections contiguous to the void spaces, and by substantially uniform distribution of said void spaces is meant that the frequency of said 2-dimensional spaces in the same electron micrograph approximates the frequency of the constituent particles within ±25%, preferably within ±15%.

The particle size and particle size distribution sought to be imparted to the agglomerate particles is dictated and controlled by the type of polymerization reaction in which the ultimate supported catalyst will be employed. For example, a solution polymerization process typically can employ an average particle size of from about 2 to about 10 microns; a continuous stirred tank reactor (CSTR) slurry polymerization process of from about 8 to about 25 microns; a loop slurry polymerization process of from about 10 to about 150 microns; and a gas phase polymerization process of from about 20 to about 120 microns. Moreover, each polymer manufacturer has its own preferences based on the particular reactor configuration.

Once the desired average particle size is determined for the agglomerates, the particle size distribution will desirably be such that typically from about 30 to about 90, preferably from about 40 to about 90, and most preferably from about 50 to about 90 weight % of the agglomerate particles possess the desired average particle size.

Accordingly, as a generalization, the average particle size of the agglomerates will range typically from about 1 to about 250 (e.g. about 8 to about 25), and preferably from about 10 to about 150 (e.g. about 20 to about 120) microns.

The bulk density of the agglomerates will range typically from about 0.1 to about 0.35 g/cc (e.g. about 0.16 to about 0.27 g/cc).

The surface area of the agglomerates is controlled to range typically from about 1 to about 1000, preferably from about 150 to about 800 m²/g.

The constituent primary particles of the support agglomerates are controlled to possess an average particle size and particle size distribution within the ranges specified for the inorganic oxide particles in the slurry used for spray drying from which they are derived.

The terms "surface area" and "pore volume" refer herein to the specific surface area and pore volume determined by nitrogen adsorption using the B.E.T. technique as described by S. Brunauer, P. Emmett, and E. Teller in Journal of the American Chemical Society, 60, pp. 209–319 (1939).

Bulk density is measured by quickly transferring (in 10 seconds) the sample powder into a graduated cylinder which overflows when exactly 100 cc is reached. No further powder is added at this point. The rate of powder addition prevents settling within the cylinder. The weight of the powder is divided by 100 cc to give the density.

The frangibility of the support agglomerates is characterized by the Attrition Quality Index (AQI) as defined by the following equation:

$$AQI = Z - Y \qquad \text{Equation 3}$$

wherein: (a) for an agglomerate sample containing (prior to sizing or agitation) at least 20 weight % thereof of agglomerate particles having a particle size between 30 and 100 microns, Y is the percentage of particles having a particle size less than 16 microns, in a starting sample (i.e., prior to agitation) sized by screening to contain agglomerate particles having an average particle size between 30 and 100 microns, and Z is the percentage of particles in the same sized starting sample having a particle size less than 16 microns after agitation, and (b) for agglomerate samples failing to qualify under (a), Y is the percentage of particles having a particle size less than X prior to agitation, and Z is the percentage of particles having a particle size less than X after agitation, where X is the particle size of the 10th percentile of the particle size distribution curve of the sample prior to agitation. The agitation is created by a supply of tangential stream of air at a rate of 9 liters per minute through an aperture having a diameter of 0.06 ±0.005 inches for thirty minutes. Agitation is performed under conditions of 60% relative humidity and a temperature of 25° C.

The AQI measures the particle's resistance to attrition by measuring the amount of fines (e.g. <16 $\mu$) generated by circulating the material in a jet cup. The content of fines in the original powder is measured by Malvern as described above.

Figure 9:
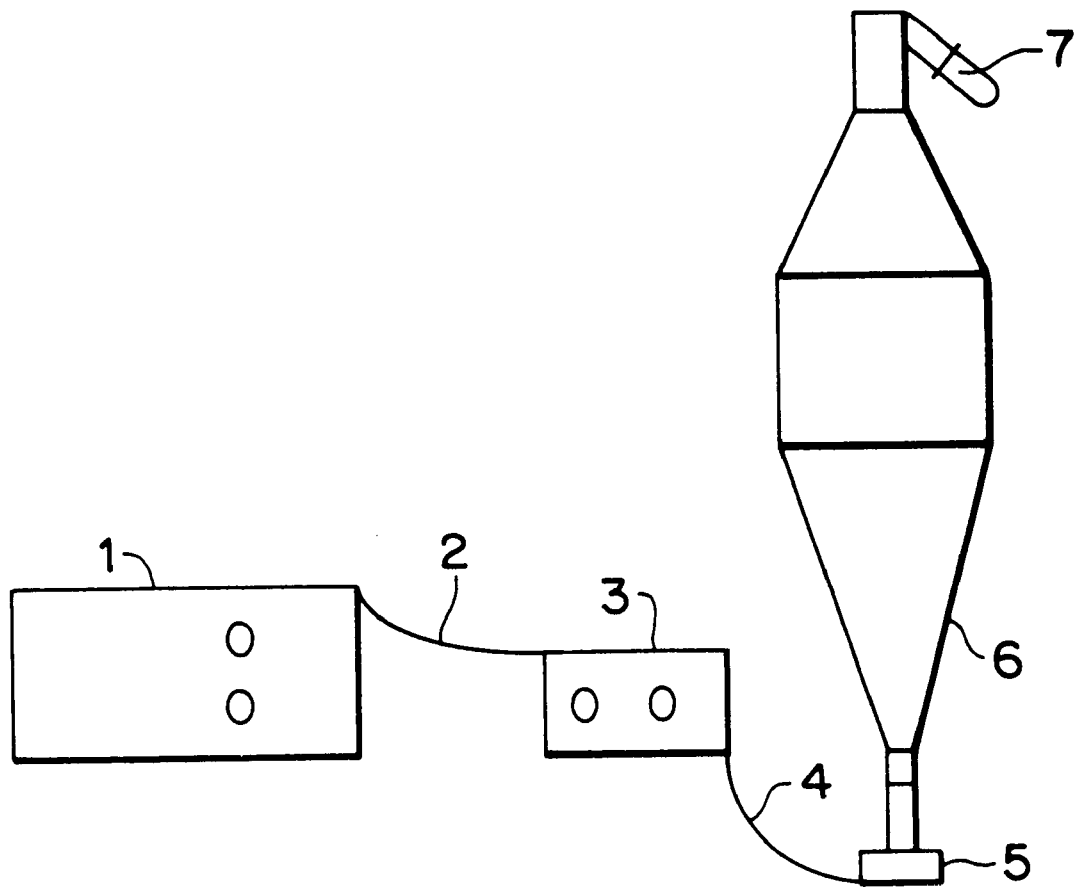
FIG. 9 is a schematic diagram of the apparatus used to determine AQI.

Referring to FIG. 9, after a 5 gram sample (previously analyzed for particle size distribution) has been added to chamber 6, flow-temperature humidity-controller 1 maintains air in feed line 2 at a temperature of 25° C. and relative humidity of 60%. The air in feed line 2 is passed through mass flow controller 3, which maintains the rate of introduction of air into the bottom of tungsten carbide jet cup 5 through line 4, which terminates with a 0.0625 inch orifice, at a flow rate of 9 liters per minute. The air enters cup 5 tangentially to the gravity feed of particles in chamber 6 (ranging from 1 to 12 inches in inner diameter, 9 inches in height), and causes the particles to rotate around chamber 6. The injected air passes up through chamber 6 and out through exhaust vent 7, which is covered with a Whatman #2810432 thimble to retain particles which might otherwise be ejected. The air injection is conducted continuously for 30 minutes, at which time the sample is collected for analysis of particle size distribution as described hereabove. The sample is weighed to assure it has all been collected, including any particles trapped in the thimble. Particular attention should be paid to assure that no particles remain stuck to the sides of the chamber walls, e.g., by static electricity. The AQI is then determined as described in the above equation.

Thus, the lower the AQI, the less frangible the support will be and vice-versa.

Accordingly, it has been found that the spray drying needs to be controlled to impart an AQI to the catalyst support upon spray drying of typically at least 10 (e.g. at least 20), preferably at least 30 (e.g. at least 40), most preferably at least 50 (e.g. at least 60), and typically from about 10 to about 70 (e.g. 20–70), preferably from about 30 to about 65, and most preferably from about 40 to about 65 (e.g. 50–65).

If the AQI is too low, the agglomerate particles will not fragment readily and will impede polymerization resulting in lower activity catalysts. From a practical standpoint, it is difficult to judge what the maximum permissible AQI should be since the upper limit is dictated by how gently one wishes to handle the agglomerates. Therefore, as long as an agglomerate is formed in the first place, there is no real functional upper limit on the AQI.

In order to impart the desired target properties described above to the agglomerate, it is important to control the spray drying conditions and particularly the pH of the aqueous slurry to be spray dried, as well as its dry solids content. By "dry solids content" as used herein is meant the weight of solids in the slurry after such solids have been dried at 175° C. for 3 hours, and then at 955° C. for 1 hour. Thus, dry solids content is used to quantify the weight of solid ingredients which exist in the slurry and to avoid inclusion of adsorbed water in such weight.

To obtain the desired AQI, it has been found that the pH of the slurry is inversely proportional to AQI, i.e. increases in pH generally lead to decreases in AQI and vise-versa, and the dry solids content of the slurry is inversely proportional to AQI, i.e. increases in dry solids content generally lead to decreases in AQI and vise-versa.

Therefore, one must adjust both the slurry pH and dry solids content to achieve the target AQI. However, the particular combination of slurry pH and dry solids content selected will also be influenced by the wet milled:dry:milled dry solids ratio employed to make the slurry.

Typically, when the wet milled:dry milled dry solids ratio is ≦1:1, the pH of the slurry will be controlled to be typically from about 6 to about 9, preferably from about 7.5 to about 8.5, and the dry solids content will be controlled to be typically from about 10 to about 20, preferably from about 14 to about 20, and most preferably from about 15 to about 18 (e.g. 15) weight % based on the weight of the slurry and the dry weight of the gel.

However, when the wet milled:dry milled dry solids ratio is greater than 1:1, the pH is lowered to typically from about 3 to about 6, preferably from about 3 to about 5 (e.g. about 3.5), and the solids content controlled as described above in order to still achieve a high AQI.

Control of the remaining variables in the spray drying process, such as the viscosity and temperature of the feed, surface tension of the feed, feed rate, the selection and operation of the atomizer (preferably an air atomizer is employed and preferably without the use of a pressure nozzle), the atomization energy applied, the manner in which air and spray are contacted, and the rate of drying, are well within the skill of the spray dry artisan once directed by the target properties sought to be imparted to the product produced by the spray drying. (See for example U.S. Pat. No. 4,131,452).

Product separation from the drying air follows completion of the spray drying stage when the dried product remains suspended in the air. Any convenient collection method can be employed, such as removal from the base of the spray dryer by the use of separation equipment.

Depending on the type of catalyst to be applied to the support, the catalyst support will be calcined. Certain catalyst types which are affected by water, such as Ziegler-Natta catalysts, metallocene catalysts, chromocene and silylchromate catalysts, or other organometallic catalysts known to be sensitive to water require calcination to remove any residual moisture present in the support.

When calcination is employed, it will typically be conducted for sufficient temperature and time to reduce the total volatiles to between about 0.1 and 8 weight % where the total volatiles are determined by measuring the weight loss upon destructive calcination of the sample at 1000° C. Accordingly, calcination will typically be conducted by heating the support to temperatures of typically from about 150 to about 850, and preferably from about 200 to about 700° C. for periods of typically from about 1 to about 600 (e.g. 50 to 600), and preferably from about 50 to about 300 minutes. The atmosphere of calcination can be air or an inert gas. Calcination should be conducted to avoid sintering.

Because the catalyst supports of the present invention are frangible, calcination should be conducted in equipment which places low stress on the agglomerates, such as rotary calciners, fixed bed ovens, or multiple hearth furnaces. Fluidized bed dehydrators can also be used.

It has been observed that the AQI of the support may undergo a reduction after calcination. Such reductions in AQI can vary typically from about 0 to about 65% of the precalcination AQI. Consequently, if the support is to be calcined, the spray drying conditions should be adjusted to impart a precalcination AQI which is sufficiently high that the resulting AQI after calcination is at or above the afore-described target AQI's.

After spray drying, and calcination if employed, the support agglomerates are preferably sized. This can be conveniently accomplished by screening or air classifying as is well known in the art.

The particle size and particle size distribution selected will depend on the catalyst type and polymerization process to be applied, as would be well known in the art.

The resulting spray dried agglomerates can be employed as supports for a wide variety of catalysts, or catalyst system components, including Ziegler-Natta, metallocene, Cr, Ni or Pd based complexes, catalysts, co-catalysts, and activator components.

"Ziegler-Natta" ("ZN") catalysts are conventionally understood to comprise a transition metal (Group IIIB through VIIIB) halide, alkyl, aryl, or alkoxy compounds and mixtures thereof in combination with Group I through III elements of the Periodic Table. A typical example is $TiCl_4$ and $AlEt_3$. Preferred Zeigler-Natta systems are those employing a complex of magnesium chloride/titanium halide or alkoxy compound and an aluminum alkyl deposited on the novel supports of this invention. Methods of producing catalysts are known in the art. Electron donors may also be used in Zeigler-Natta catalyst systems of the present invention and include, esters, ethers, amines, silanes and alcohols, and mixtures thereof.

Moreover, when the spray dried agglomerates are intended to support Ziegler-Natta catalysts, it is possible to employ metal oxide-silica gels as the material to be spray dried to enable the resultant product to act as the source of the active catalyst metal source, such as titania containing silica cogels.

"Metallocene" catalysts are commonly understood to mean organometallic compounds having a transition metal, including rare earth metals, in coordination with members of at least one five-member carbon ring, hetero-substituted five-member carbon ring, or a bridged (ansa) ligand defined as two cyclic moieties capable of coordinating to the transition or rare earth metals wherein the ansa bridge B can be carbon, silicon, phosphorus, sulfur, oxygen, nitrogen, germanium, species such as $CH_2CH_2$ (ethylene), $Me_2Si$ (dimethylsilyl), $Ph_2Si$(diphenylsilyl) $Me_2C$ (isopropylidene), $Ph_2P$(diphenylphosphoryl) $Me_2SiSiMe_2$ (tetramethyldisilane) and the like. In particular, preferred metallocenes are derivatives of a cyclopentadiene(Cp), including cyclopentadienyl, substituted cyclopentadienyls, indenyl, fluorenyl, tetrahydroindenyl, phosphocyclopentadienes, 1-metallocyclopenta-2,4-dienes, bis(indenyl)ethane, and mixtures thereof. Metallocene catalyst is typically activated by combining the active metal species with boranes, borates, or aluminoxane compounds well known in the art.

The transition metal component of the metallocene is selected from Groups IIIB through Group VIII of the Periodic Table and mixtures thereof, preferably Group IIIB, IVB, VB, VIB, and rare earth (i.e., lanthanides and actinides) metals, and most preferably titanium, zirconium, hafnium, chromium, vanadium, samarium, and neodymium. Of these, Ti, Zr, and Hf are most preferable.

It is also believed that the compositions and methods described herein are suitable for use with catalysis that are palladium and nickel-based complexes (e.g., Ni, Pd, coordinated to diimine (non-cyclopenta-dienyl, nitrogen-containing) ligands) as described in Brookhart, Johnson, and Killian, J. Am. Chem. Soc., 117,6414 (1995) and PCT Pub. No. WO96/23010, the disclosures of which are herein incorporated by reference. Typical versions of these catalysts are cationic and can be activated in ways similar to metallocenes using aluminoxane or borate co-catalysts.

Ziegler-Natta, metallocene, and Ni, Pd based complex catalysts, co-catalyst, and activator components can be impregnated in and on the supports of the present invention using any number of known techniques. Thus, the catalyst components sought to be impregnated into the agglomerate supports of the present invention are typically dissolved or suspended in an organic solvent, the agglomerate support is added and slurried, and optionally solvent evaporated. Evaporation desirably takes place in a conical dryer which avoids applying high stress to the frangible agglomerates. Many variations on this theme are possible and the particular impregnation technique will depend on the particular catalyst system to be employed, as is well known in the art.

Suitable hydrocarbon media which can be employed for impregnation and which can serve as diluent or solvent for catalyst components employed include, aliphatic hydrocarbons, aromatic hydrocarbons, naphthinic hydrocarbons, and combinations thereof. Particularly, suitable hydrocarbons include, for example, pentane, isopentane, hexane, heptane, octane, isooctane, nonane, isononane, decane, cyclohexane, methylcyclohexane, toluene, and combinations of two or more of such diluents. Ethers such as diethylether and tetrahydrofuran can also be used.

The temperature employed for impregnation is generally from −20° C. to 120° C., preferably from 0C. to 100° C., and most preferably from 20° C. to 70° C.

For oxygen or moisture sensitive catalyst components, the above described process steps should be conducted under an inert atmosphere to exclude air (oxygen) and moisture as much as possible. Suitable inert gases include nitrogen, argon, helium, and the like.

The supported catalyst thus prepared can be employed, without separation or purification, in the polymerization of olefins as described hereinafter. Alternatively, the supported catalyst can be stored in the hydrocarbon medium, or isolated from the hydrocarbon medium and dried and stored under inert conditions for an extended period of time, for example, for one to several months.

Catalyst system components supported on the agglomerate described herein are useful to produce polymers using solution polymerization, slurry polymerization, or gas phase polymerization techniques. As used herein, the term polymerization includes copolymerization and terpolymerization, and the terms olefins and olefinic monomers include olefins, alpha-olefins, diolefins, styrenic monomers, acetylenically unsaturated monomers, cyclic olefins, and mixtures thereof.

Methods and apparatus for effecting such polymerization reactions are well known. The supported catalyst according to the present invention can be used in similar amounts and under similar conditions known to olefin polymerization catalysts. Typically for the slurry process, the temperature is from approximately 0°C. to just below the temperature at which the polymer becomes soluble in the polymerization medium. For the gas phase process, the temperature is from approximately 0° C. to just below the melting point of the polymer. For the solution process, the temperature is typically the temperature from which the polymer is soluble in the reaction medium, up to approximately 275° C.

The pressure used can be selected from a relatively wide range of suitable pressures, e.g., from subatmospheric to about 20,000 psi. Suitable pressure is from atmospheric to about 1000 psi, and most preferred from 50 to 550 psi. In the slurry or particle form process, the process is suitably performed with a liquid inert diluent such as a saturated aliphatic hydrocarbon. The hydrocarbon is typically a $C_4$ to $C_{10}$ hydrocarbon, e.g., isobutane or an aromatic hydrocarbon liquid such as benzene, toluene or xylene. The polymer is recovered directly from the gas phase process or by filtration or evaporation from the slurry process, or evaporation of solvent from the solution process.

The support and catalyst system of the present invention is particularly suited for the gas phase and slurry phase polymerization processes, and particularly useful for the production of polyethylene and polypropylene using a Ziegler-Natta catalyst.

All references herein to elements or metals belonging to a certain Group refer to the Periodic Table of the Elements and Hawley's Condensed Chemical Dictionary, 12th Edition. Also, any references to the Group or Groups shall be to the Group or Groups as reflected in this Periodic Table of Elements using the CAS system for numbering groups.

The following examples are given as specific illustrations of the claimed invention. It should be understood, however, that the invention is not limited to the specific details set forth in the examples. All parts and percentages in the examples, as well as in the remainder of the specification, are by weight unless otherwise specified.

Further, any range of numbers recited in the specification or claims, such as that representing a particular set of properties, conditions, physical states or percentages, is intended to literally incorporate expressly herein any number falling within such range, including any subset of numbers within any range so recited.

EXAMPLES

Example 1

Silica gel is prepared by mixing an aqueous solution of sodium silicate and sulfuric acid under suitable agitation and temperature to form a hydrogel containing 35 weight % $SiO_2$. The resulting gel is acid washed with a sulfuric acid solution. The acid wash is followed by a fresh water wash wherein the gel is placed in a recirculating bath at 82° C. The water is drained and fresh water added. This procedure is repeated four times. The surface area of the gel is thereby reduced to about 600 $m^2/g$. The resulting water washed gel has a particle size of about 0.63 cm. and is referred to herein as Sample 1.

Sample 2 was prepared similarly, achieving a final surface area of 620 $m^2/g$.

Samples 3–5 were obtained by aging the acid washed gel for ~36 hours at 65–82° C., pH 8, to obtain a final surface area of about 300–380 $m^2/g$.

Example 2 (Dry Milling)

Starting silica gel Samples 1–5 prepared in accordance with Example 1 were subjected to a dry milling procedure as follows:

Each sample was flash dried to a moisture content below 10 weight % Each flash dried powder sample was then fluid energy milled. The flash dried and milled powder was collected and its properties analyzed and reported at Table 1. Run Nos. 1–5 of Table 1 are derived from corresponding Samples 1 to 5 of Example 1.

Example 3 (Wet milling)

Starting silica gel Samples 1–5 prepared in accordance with Example 1 were subjected to wet milling in a sand mill. After reducing the bulk sample particle size to about 20 microns with a blade mill, sand milling is conducted at a dry solids content of about 20% until the average particle size is between 8 and 10 microns and particle size distribution is 3/8–10/25–30 microns for D10, D50 and D90. The resulting wet milled samples are designated Runs 6 to 10 and are derived from corresponding Samples 1–5 of Example 1. All the samples of Runs 6–10 had a colloidal content between 20 and 30 weight % as determined by centrifugation.

Example 4 (Preparation of Spray Dry Slurry and Agglomerates)

Slurries were prepared using amounts of the wet milled gel prepared as per Example 3, and dry milled powder prepared as per Example 2, to obtain a wet milled:dry milled dry solids ratio as reported in Table 2. The dry solids content of the wet milled slurry was adjusted (prior to adding the dry milled powder) by the addition of water in an amount sufficient to impart a total dry solids content to each slurry as reported in Table 2, after addition of the dry milled powder thereto. The pH of the slurry was adjusted with sulfuric acid or ammonia base to achieve the target pH reported in Table 2. Samples of the slurry were removed to determine average particle size and particle size distribution of the particles present therein as reported in Table 2. The resulting slurry was then spray dried and the properties of the resulting agglomerates reported in Table 3. All spray drying was done using a Bowen 3' diameter spray dryer with inlet-outlet temperatures of 350/150° C. and a two-fluid spray nozzle using air at 20–30 psi to atomize the slurry. The air through-put was dampened to keep the spray chamber under 7" water of vacuum and the slurry was fed in at 250–300 cc/min. The resulting spray dried samples were designated Runs 16–20 and were screened through a 250 mesh screen to produce the APS reported in Table 3. Scanning electron micrographs were taken where reported in Table 3, and are attached hereto as FIGS. 1 to 6. The AQI of each fresh sample, presized through an 80 mesh (177 micron) screen, is also reported at Table 3.

Example 5 (Preparation of Catalyst Impregnated Support)

Samples of certain of the supports prepared in accordance with Example 4 were calcined at 600° C. for four hours in a furnace.

The resulting calcined supports were then treated as follows to impregnate the support with various catalyst components. Schlenk and glove box techniques were used throughout to exclude water and oxygen, and all solvents were thoroughly dried and degassed prior to use.

Catalyst Impregnated Support 1 (CIS-1)

This catalyst impregnation procedure follows generally the procedure outlined in PCT Pub. No. WO96/05236. 10.0 grams of support from Run No. 16 were slurred in 50 ml of heptane. Dibutylmagnesium (20 mmol) was added dropwise and the slurry was stirred for 1 hour. Anhydrous hydrogen chloride was bubbled through the suspension for 10 minutes (or until an aliquot of the suspension was slightly acidic). Excess HCl was removed by purging the flask with argon for 10 minutes. The off-white slurry was treated with 2.9 mmol of $TiCl_4$ and stirred for 1 hour. Diethylaluminum chloride (DEAC, 25 mmol) was added dropwise and stirring continued for 2 hours. Volatiles were removed under vacuum to yield a free-flowing powder.

CIS-2 Prepared using the same procedure for CIS-1, except employing 10.0 grams of support from Run No. 17.

CIS-3 Prepared using the same procedure for CIS-1, except employing 10.0 grams of support from Run No. 18.

CIS-4 Prepared using the same procedure for CIS-1, except employing 10.0 grams of support from Run No. 19.

CIS-5 Prepared using the same general procedure as for CIS-1, except employing 10.0 grams of support from Run No. 20

CIS-6 Prepared using the same general procedure as for CIS-1, except employing the following amounts of reagents: 25.0 mmol of dibutylmagnesium; 5.2 mmol of $TiCl_4$; 37.5 mmol of DEAC.

CIS-7 This supported catalyst was prepared using the general procedure outlined in U.S. Pat. No. 5,470,812, Example A. 10.0 grams of support from Run No. 20 (calcined at 600° C.) was slurried in 50 ml of heptane and treated with 7.0 mmol of dibutylmagnesium at 50° C. Stirring was continued for one hour. Tetraethylorthosilicate (TEOS, 4.4 mmol) was added to this slurry (50° C.) and, after 2 hours of stirring, 0.78 ml of $TiCl_4$ was added followed by one hour of additional stirring. Volatiles were removed under vacuum to leave a dry, free-flowing powder.

The metal loadings of the above catalyst impregnated samples are summarized at Table 4.

Example 6 (Polymerization)

In the slurry polymerization experiments of this Example, unless otherwise indicated, a 2-liter Zipperclave (Autoclave Engineers, Inc.) reactor was rendered inert by heating under vacuum at 80° C. for 2 hours. A reactor charge consisting of 300 ml of dry, degassed heptane, 700 micromoles of tri-isobutylaluminum co-catalyst, unless otherwise indicated, and the amount of catalyst indicated in Table 4 was admitted to the reactor. A final reactor pressure of 180 psig was quickly attained comprising a hydrogen/ethylene partial pressure ratio of 0.5. The polymerization temperature was 75° C., unless otherwise indicated. Ethylene was supplied on demand via a mass flow controller to maintain the reactor pressure at 180 psig. After 60 minutes, the ethylene feed was stopped and the reactor cooled and vented. The polymer was treated with acetone to deactivate any residual catalyst, filtered, and dried under vacuum to constant weight. After drying, the polymer was weighed to calculate catalyst activity and a sample of dried polymer was used to determine apparent bulk density according to the procedure of ASTM 1895 (unsettled bulk density). Another sample of this polymer was treated with a standard antioxidant package and Melt Index (MI) is determined according to ASTM D1238 Condition E; High Load Melt Index (HLMI) by ASTM D1238 Condition F. Melt Flow Ratio (MFR) is determined by dividing HLMI by MI.

Comparative Example 1

Silica hydrogel was made by mixing sodium silicate and sulfuric acid in such a way as to form a clear silica sol having a pH of 0.5 to 1.0, which eventually hardens into a hydrogel. The concentrations of the reactants were chosen so as to end up with a hydrogel which after washing, has a weight % solids of about 30–35. Washing and aging were conducted simultaneously by exposing the hydrogel to a continuously moving stream of fresh water at 82° C., pH 9, for 36 hr. After this time, the salt level of the gel was reduced to <0.3% and the surface area was ~300 $m^2$/gm. When quickly dried to form an aerogel, the pore volume was 1.4 to 1.6 cc/gm.

The washed hydrogel was then mixed with water to form a slurry of 19–20% solids. The slurry was then mechanically milled to reduce the particle size such that the 10th, 50th, and 90th percentiles (i.e. D10, D50, and D90) of the distribution were in the range of 5–10, 15–25, and 40–50 microns, respectively. The process generated a significant amount of colloidal silica (15–25 weight % of the total amount of $SiO_2$ present). The slurry properties are summarized at Run 15C. A blade mill was employed for milling which exposes the silica particles in the slurry to a set of high RPM blades which disintegrates the gel finely enough to be passed through a screen barrier with openings of 150 microns. The milled slurry was then spray dried using a wheel atomizer and inlet-outlet temperatures of 350–150° C. The resulting aerogel was air classified to give a particle size distribution of about 20/55/80 microns, the numbers shown being the 10/50/90 percentile points of the distribution. The SA/PV was about 300/1.55 and the AQI was 5. The product was spherical with a smooth surface and had a low void space within the particle. The bulk density was 0.22 cc/gm. Electron micrographs were taken and are shown as FIGS. 3 and 6. The resulting agglomerate sample was designated Comparative Support 1 (Comp. S-1), and the properties are summarized at Run 21.

Comparative Example 2

A Comparative Catalyst Impregnated Support (CCIS-1) was prepared according to the general procedure of CIS-1, except employing 10.0 grams of Comp. S-1.

Comparative Example 3

CCIS-2 was prepared according to the general procedure for CIS-6, except employing 10.0 grams of Comp. S-1.

Comparative Example 4

CCIS-3 was prepared according to the general procedure for CIS-7, except employing 10.0 grams of Comp. S-1.

The metal loadings of the Comparative Catalyst Impregnated Supports are summarized in Table 4.

Comparative Example 5

The resulting CCIS samples were then tested in accordance with Example 6 and the results reported at Table 4.

Example 7

The CIS-6 sample of Run 27 was subjected to an Element Profile analysis in accordance with the following procedure, designed specifically for analysis of air sensitive catalysts.

Elemental distribution through the internal matrix of a catalyst support is obtained by first mounting several of the catalyst particles in epoxy. The mounted samples are then heated to accelerate the curing process to minimize any possible reaction between the catalyst and epoxy. After the sample block has cured, the cured epoxy block is mounted a second time in Buehler cold mount epoxy. This final mount is then ground using 180 grit silicon carbide and then polished using 0.05 µm alpha aluminum powder under Argon. Elemental line scans for the elements of interest are then obtained with a Cameca SX50 electron microprobe using a beam accelerating voltage of 25 kV and a beam current of 20 nA.

More specifically, the epoxy sample block is mounted in a stage capable of moving in a direction transverse to the fixed electron beam. The cross-section of the particle faces the beam and is passed under the same while a detector registers X-ray counts for Si, Mg, and Ti. The beam width is 1 micron. The particle is moved such that the beam traces a path from one edge of the cross-section to the opposite edge, across the diameter of the exposed surface. Plots are then made of the X-ray counts for each of Si, Mg, and Ti, (Y-axis) versus distance traveled by the particle under the beam in microns (X-axis). Since detection is started before the beam contacts the particle, the results at the initial distances register 0 counts until the particle surface first contacts the beam.

The resulting plot illustrates the concentration (measured in counts) of the subject elements across the interior of the particle.

Figure 7:
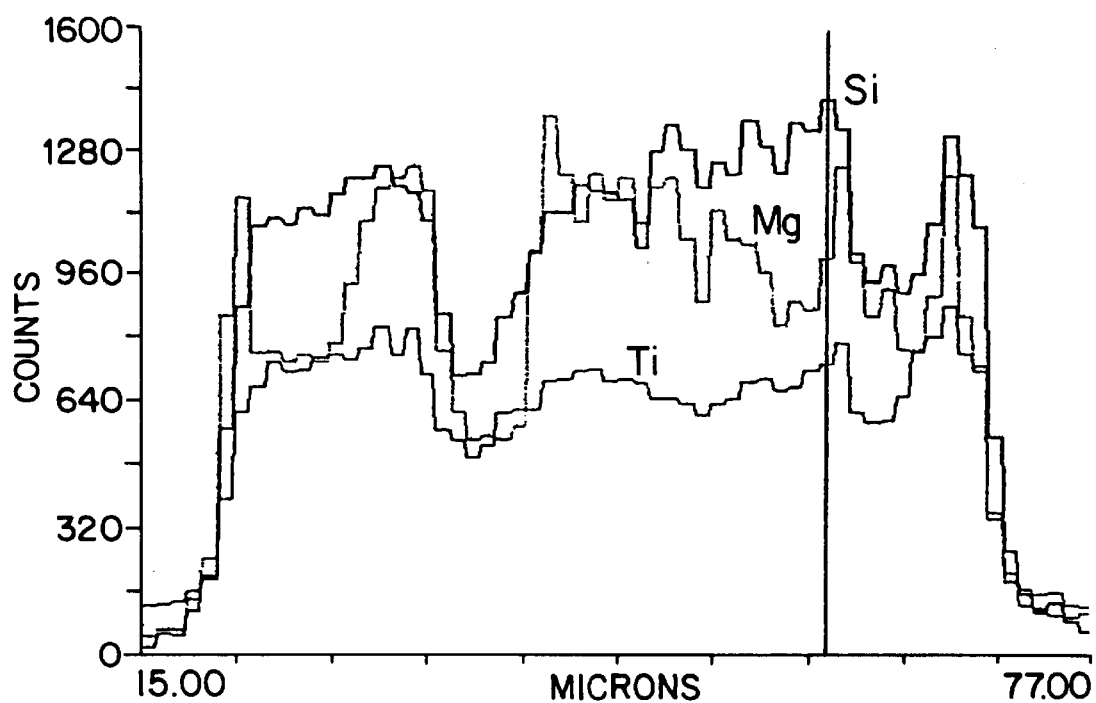
FIG. 7 is an Element Profile, conducted in accordance with Example 7, of the distribution of Ti and Mg within the agglomerate particles prepared in accordance with Example 4, Run No. 16, and the catalyst impregnation procedure for CIS-6.

The results of the Element Profile analysis on CIS-6 are shown at FIG. 7.

Comparative Example 6

Figure 8:
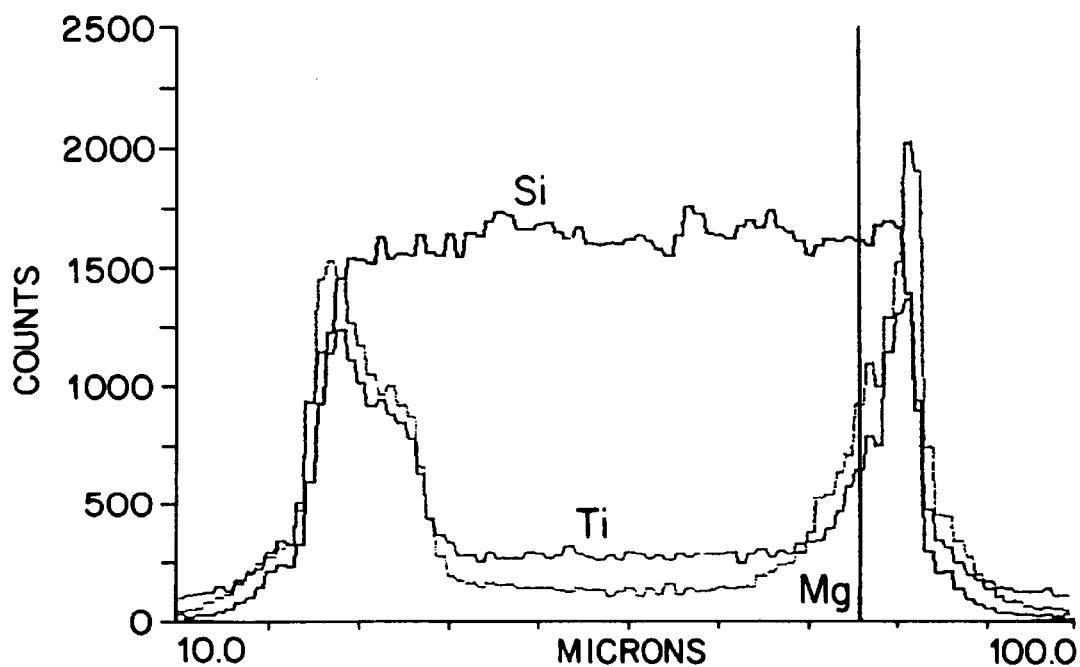
FIG. 8 is an Element Profile, conducted in accordance with Comparative Example 6, of the distribution of Ti and Mg within the agglomerate particles prepared in accordance with Comparative Example 1, Run No. 21, and the catalyst impregnation procedure for CCIS-1 (same as CIS-1).

Example 7 was repeated using the CCIS-1 sample of Run 28, and the Element Profile is shown at FIG. 8.

Discussion of Results

Figure 4:
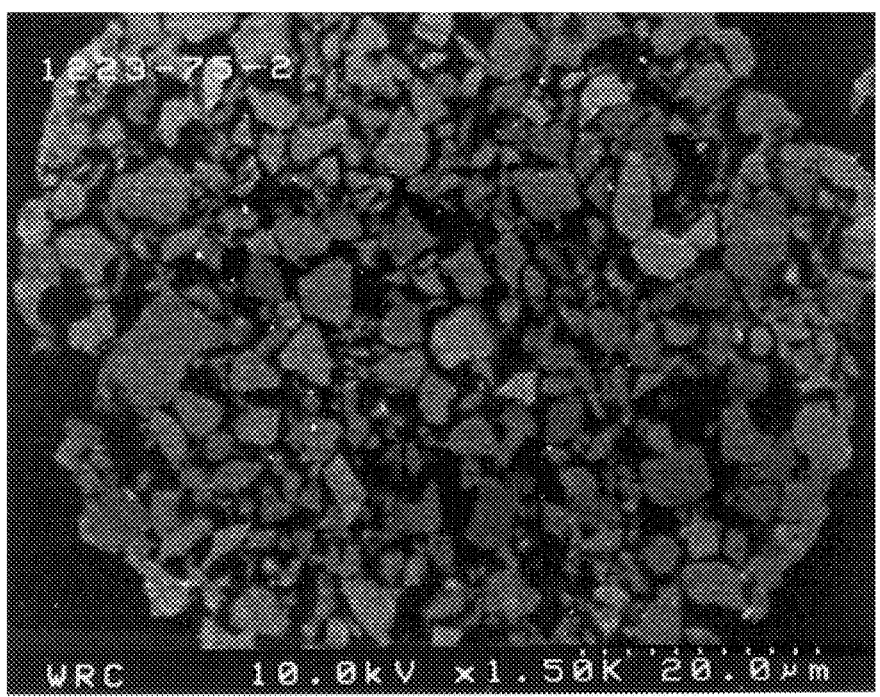
FIG. 4 is an electron micrograph of a cross-section of an agglomerate particle prepared in accordance with Example 4, Run No. 16. The photograph was taken with a scanning electron microscope and represents a 1,500-fold magnification of the actual particle.

Referring to FIG. 1, it can be seen that the agglomerate particle surface derived from Run 16 possesses a scabrous appearance, and is microspheroidal with numerous, i.e. >35, holes that penetrate the surface of the particle. The corresponding cross-section of the FIG. 1 particle, i.e. FIG. 4, shows numerous interior void spaces of substantially uniform size and distribution relative to the constituent particles contiguous to such spaces. The AQI was 65.

Figure 3:
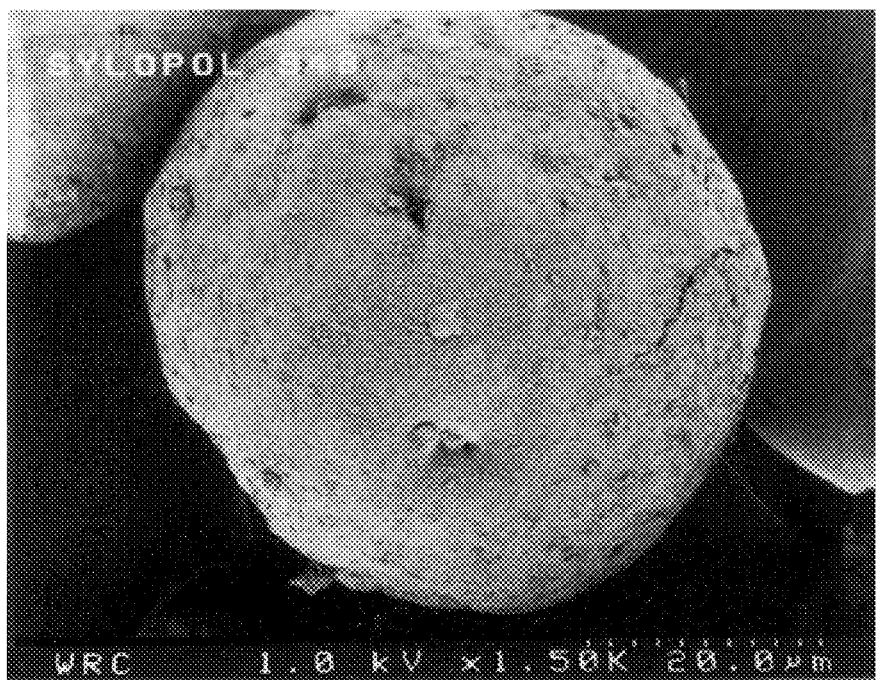
FIG. 3 is an electron micrograph of an agglomerate particle prepared in accordance with Comparative Example 1, Run No. 21. The photograph was taken with a scanning electron microscope and represents a 1,500-fold magnification of the actual agglomerate particle.
Figure 6:
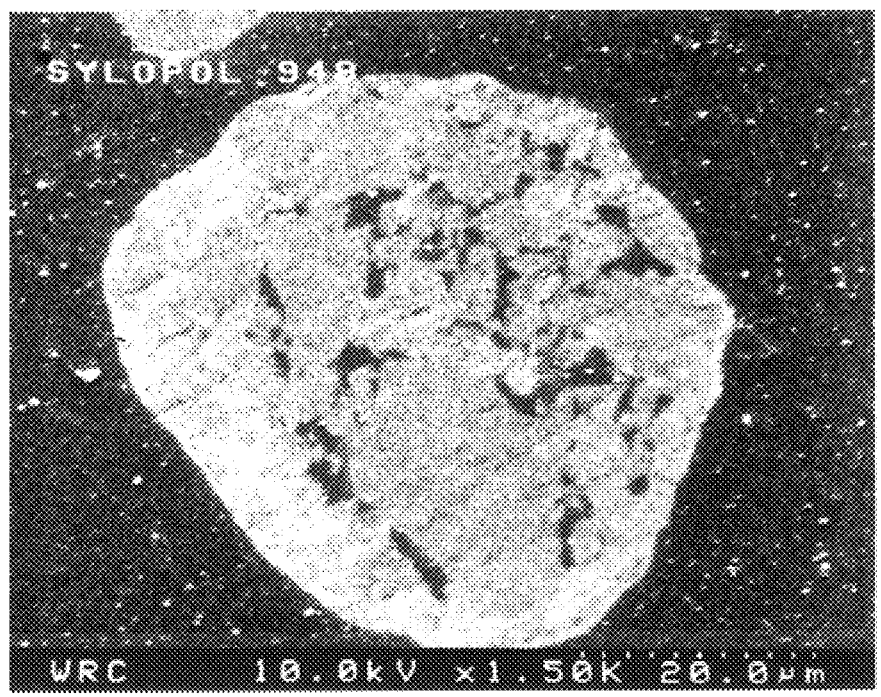
FIG. 6 is an electron micrograph of a cross-section of an agglomerate particle prepared in accordance with Comparative Example 1, Run No. 21. The photograph was taken with a scanning electron microscope and represents a 1,500-fold magnification of the actual agglomerate.

In contrast, the agglomerate particle surface of FIG. 3 derived from Comparative Example 1, Run No. 21, is smooth in appearance with not more than 5 visible penetration holes. Similarly, the corresponding cross-section, i.e. FIG. 6, shows primarily a solid interior with non-uniform distribution of the few void spaces actually present. It will be observed that this sample has an AQI of 5 and was prepared using wet milling only.

Figure 2:
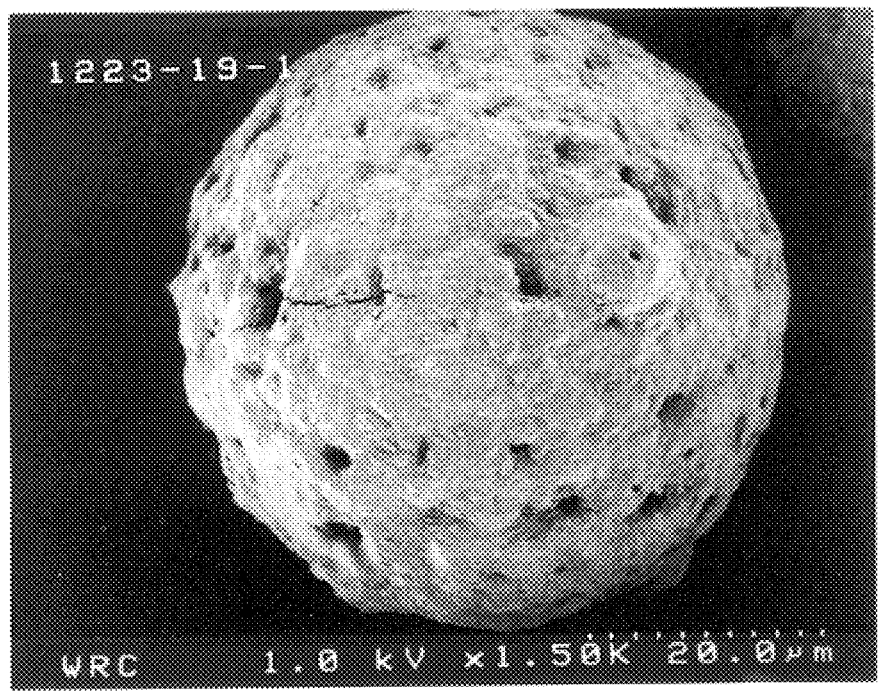
FIG. 2 is an electron micrograph of an agglomerate particle prepared in accordance with Example 4, Run No. 18. The photograph was taken with a scanning electron microscope and represents a 1,500-fold magnification of the actual agglomerate particle.

FIGS. 2 and 5 also illustrate agglomerates of the present invention and are derived from Run 18.

Referring to Table 4, it can be seen that the catalyst activity of Comparative Runs 28, 29, and 31 is significantly below the activity of corresponding (similar catalyst impregnation procedures) Runs 22, 27, and 30, respectively. However, the polymer properties of resins from Comparative Runs 28, 29, and 31 are comparable to those from corresponding Runs 22, 27, and 30, respectively. For example, resins from Runs 30 and 31 both have relatively low MFR (27), yet the catalyst used in Run 30 is twice as active as that used in Run 31.

Referring to FIG. 7, which is typical for catalysts prepared on the inventive supports described herein, it can be seen that the Mg and Ti are distributed more uniformly across the agglomerate interior than is illustrated in FIG. 8. Without wishing to be bound by any particular theory, this is believed to be attributable to the ability of the catalyst to penetrate the interior of the surface of the agglomerates of the present invention more easily than the agglomerates of the prior art.

The more uniform metal distribution, together with the higher AQI employed in the present invention, are in return believed to be responsible for improved catalyst performance.

TABLE 1

Dry Milling

| | | Column No. | | | |
|---|---|---|---|---|---|
| | | 1 | 2 | 3 | 4 | 5 |
| | | Surface Area | Pore Volume | APS | PSD | PSD |
| Run No. | Ex. No. | ($m^2$/gm) | (cc/g) | (microns) | SPAN | D10/D50/D90 |
| 1 | 2 | 609 | 1.67 | 4.4 | 1.20 | 2.6/4.4/7.9 |
| 2 | 2 | 654 | 1.57 | 4.4 | 0.95 | 2.8/4.4/7.0 |
| 3 | 2 | 380 | 1.70 | 5.6 | 1.07 | 3.5/5.6/9.5 |
| 4 | 2 | 340 | 1.84 | 4.9 | 0.92 | 3.0/4.9/7.5 |
| 5 | 2 | 304 | 1.55 | 4.0 | 1.02 | 2.3/4.0/6.4 |

APS = Average Particle Size
PSD SPAN = Particle Size Distribution Span determined by Equation 1
PSD = Particle Size Distribution (i.e., particle size of 10th, 50th, and 90th percentile, referred to herein as D10, D50, and D90, respectively)

TABLE 2

Spray Drying Slurry and Conditions

| Run No. | Ex. No. | Source of Wet Milled/Dry Milled Samples (Run Nos.) | Wet Milled: Dry Milled Dry Solids Ratio (w/w) | Slurry Dry Solids APS (microns) | Slurry Dry Solids PSD D10/D50/D90 | Slurry Dry Solids (w %) | Slurry pH | Colloidal Content (w %) |
|---|---|---|---|---|---|---|---|---|
| 11 | 4 | 1 & 6 | 0.25:1 | 4.4 | 2.7/4.8/8.0 | 15.1 | 8.05 | 5.0 |
| 12 | 4 | 2 & 7 | 0.25:1 | 4.4 | 2.9/5.0/9.9 | 15.2 | 7.94 | 5.0 |
| 13 | 4 | 3 & 8 | 0.33:1 | 5.6 | 3.2/6.2/11.8 | 17.8 | 6.71 | 6.2 |
| 14 | 4 | 4 & 9 | 0.25:1 | 4.9 | 2.5/4.7/15.2 | 15.8 | 7.53 | 5.0 |
| 15 | 4 | 5 & 10 | 0.25:1 | 4.0 | 2.6/4.7/10.5 | 17.3 | 7.49 | 5.0 |
| 15C | Comp Ex. 1 | N/A | 1:0 | 15–25 | 5–10/15–25/40–50 | 19–20 | ? | 15–25 |

APS = Average Particle Size
PSD = Particle Size Distribution based on D10, D50, D90 percentile

TABLE 3

Spray Dried Product Properties

| | | | Column No. | | | | | | | | | |
|---|---|---|---|---|---|---|---|---|---|---|---|---|
| | | | 1 | 2 | 3 | 4 | 5 | 6 | 7 | 8 | 9 | 10 | 11 |
| | | | | | Agglomerate Properties | | | | | | Calcined | | |
| | | Slurry Source from Table 2 | W % Micro- | APS | PSD | SA | Bulk Density | Pore Vol. | IVS | FIG. | Temp. | Time | Uncalcined |
| Run No. | Ex. No. | (Run No.) | spheroidal | (microns) | D10/D50/D90 | (m²g) | (g/cc) | (cc/g) | (%) | No. | (° C.) | (Hr.) | AQI |
| 16 | 4 | 11 | >90 | 47.0 | 13.8/47/72.1 | 542 | N/D | 1.50 | 26 | 1 & 4 | 600 | 4 | 65 |
| 17 | 4 | 12 | >90 | 40.6 | 9.2/40.6/65.4 | 621 | 0.162 | 1.36 | 30 | | 600 | 4 | 62 |
| 18 | 4 | 13 | >90 | 55.0 | 19.3/55/81.9 | 382 | N/D | 1.64 | 22 | 2 & 5 | 600 | 4 | 56 |
| 19 | 4 | 14 | >90 | 36.6 | 11.8/36.6/62.4 | 299 | N/D | 1.66 | 19 | | 600 | 4 | 62 |
| 20 | 4 | 15 | >90 | 44.0 | 14.0/44.0/70.5 | 296 | 0.168 | 1.54 | 22 | | 600 | 4 | 58 |
| 21 | Comp | Comp. S-1 | >90 | 55.0 | 20/55/80 | 300 | 0.22 | 1.55 | 8 | 3 & 6 | 600 | 4 | 5 |

APS = Average Particle Size
PSD - Particle Size Distribution based on D10, D50, D90 percentile

TABLE 4

Supported Catalyst and Polymer Properties

| | | Column No. | | | | | | | | |
|---|---|---|---|---|---|---|---|---|---|---|
| | | 1 | 2 | 3 | 4 | 5 | 6 | 7 | 8 | 9 |
| | | Supported Catalyst Source/ | Supported Catalyst Metal Loadings | | | Catalyst | Polymer Properties | | | |
| Run No. | Ex. No. | Support Source (Run No.) | (w %) | (w %) | (w %) | Activity* | MI | HLMI | MFR | ABD |
| 22 | 6 | CIS-1/16 | 2.91 | 0.65 | 4.06 | 5350 | 0.82 | 31.16 | 37.8 | 0.25 |
| 23 | 6 | CIS-2/17 | 2.57 | 0.66 | 3.93 | 5010 | 0.96 | 31.35 | 32.7 | 0.27 |
| 24 | 6 | CIS-3/18 | 2.77 | 0.68 | 4.03 | 5131 | 1.00 | 36.76 | 36.8 | 0.29 |
| 25 | 6 | CIS-4/19 | 2.97 | 0.74 | 4.34 | 5880 | 0.71 | 26.42 | 37.2 | 0.33 |
| 26 | 6 | CIS-5/20 | 2.93 | 0.74 | 4.45 | 5760 | 0.68 | 26.45 | 38.9 | 0.29 |
| 27 | 6 | CIS-6/16 | 3.73 | 1.27 | 4.95 | 7940 | 0.81 | 32.67 | 40.2 | 0.28 |
| 28 | 6 | CCIS-1/21 | 2.89 | 0.66 | 4.00 | 3230 | 0.69 | 27.23 | 39.4 | 0.29 |
| 29 | 6 | CCIS-2/21 | 3.25 | 1.19 | 5.50 | 2860 | 0.89 | 33.93 | 38.1 | 0.26 |
| 30 | 6 | CIS-7/20 | 1.14 | 2.71 | 0 | 1940** | 1.87 | 50.37 | 26.9 | 0.32 |
| 31 | 6 | CCIS-3/21 | 1.26 | 2.50 | 0 | 970** | 3.66 | 99.52 | 27.2 | 0.34 |

ABD = Apparent Bulk Density
MI = Melt Index
HLMI = Highload Melt Index
MFR = Melt Flow Ratio
*Activity = gm Polymer/gm Catalyst/Hr.
CIS = Catalyst Impregnated Support
CCIS = Comparative Catalyst Impregnated Support
**= Polymerization performed at 85° C., using 3.0 mmoles of trimethyl aluminum as co-catalyst The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art, without departing from the spirit of the invention.

What is claimed is:

1. Frangible, catalyst support agglomerate particles comprising, spray dried inorganic oxide selected from $SiO_2$, $Al_2O_3$, $MgO$, $AlPO_4$, $TiO_2$, $ZrO_2$, $Cr_2O_3$, and mixtures thereof, wherein:
   (A) at least 80% of the volume of the agglomerated particles smaller than the $D_{90}$ of the entire agglomerate particle size distribution possesses a microspheroidal morphology;
   (B) the microspheroidal support agglomerate particles possess:
      (i) a surface having a rough, scabrous appearance;
      (ii) interstitial void spaces leaving a substantially uniform size and distribution within said agglomerate, with at least some of the interstitial void spaces penetrating the agglomerate particle surface thereby providing at least 10 channels from the agglomerate surface to the agglomerate particle interior; and
      (iii) an average IVS of from about 15 to about 40%;
   (C) the support agglomerate particles possess:
      (i) an average particle size in the range of about 1 to about 250 microns;
      (ii) a surface area of from about 1 to about 1000 $m^2$ per gram; and
      (iii) an AQI of from about 20 to about 65; and
   (D) the constituent particles from which the agglomerate support particles are derived have an average particle size, prior to spray drying, of from about 3 to about 10 microns.

2. The support agglomerate particles of claim 1, wherein the AQI is from about 30 to about 65.

3. The support agglomerate particles of claim 1, wherein the AQI thereof is from about 40 to about 65.

4. The support agglomerate particles of claim 1, wherein the AQI thereof is from about 50 to about 65.

5. The support agglomerate particles of any one of claims 1, 2, 3, and 4, wherein:
   (A) at least 90% of the volume of the agglomerated particles smaller than the $D_{90}$ of the entire agglomerate particle size distribution possess a microspheroidal morphology,
   (B) the support agglomerate particles possess:
      (i) an average particle size of from about 10 to about 150 microns, and
      (ii) a surface area of from about 150 to about 800 $m^2/gm$;
   (C) the constituent particles from which the support agglomerate particles are derived, prior to spray drying, have: an average particle size of from about 4 to about 9 microns, a particle size Distribution Span of from about 0.5 to about 3 microns, and a colloidal particle size content of from about 2 to about 40 weight %, based on the constituent particle weight.

6. The support particles of claim 5, which have been impregnated with at least one catalyst component of a catalyst system capable of polymerizing olefins.

7. The support particles of claim 6, wherein the catalyst component is part of a catalyst system selected from the group consisting of Ziegler-Natta, metallocene, and Ni or Pd based catalysts.

8. Frangible, catalyst support agglomerate particles comprising at least 80% by weight based, on the support weight, of spray dried silica gel wherein:
   (A) at least 80% of the volume of the agglomerated particles smaller than the $D_{90}$ of the entire agglomerate particle size distribution possess a microspheroidal morphology;
   (B) the microspheroidal support agglomerate particles possess:
      (i) a surface having a rough, scabrous appearance;
      (ii) interstitial void spaces having a substantially uniform size and distribution within said agglomerate, with at least some of the interstitial void spaces penetrating the agglomerate surface thereby providing at least 10 channels from the agglomerate surface to the agglomerate particle interior; and
      (iii) a average IVS of from about 15 to about 40%;
   (C) the support agglomerate particles possess:
      (i) an average particle size in the range of about 1 to about 250 microns;
      (ii) a surface area of from about 1 to about 1000 $m^2$ per gram; and
      (iii) an AQI of from about 20 to about 65;
   (D) the constituent particles from which the support is derived have an average particle size, prior to spray drying, of from about 3 to about 10 microns; and
   (E) the silica gel from which the support agglomerate particles are derived, prior to spray drying, contains from about 2 to about 40 weight %, based on the silica gel weight, of colloidal silica particles.

9. The support agglomerate particles of claim 8 wherein the AQI thereof is from about 30 to about 65; the microspheroidal agglomerate particles possess an average IVS of from about 20 to about 35%; and the silica gel from which the support agglomerate particles are derived, prior to spray drying, contains from about 6 to about 25 weight % colloidal particles.

10. The support agglomerate particles of claim 9, wherein the AQI thereof is from about 40 to about 65.

11. The support agglomerate particles of claim 9, wherein the constituent particles from which the support agglomerate particles are derived, prior to spray drying, possess a particle size Distribution Span of from about 0.5 to about 3.0.

12. The support agglomerate particles of claim 9, wherein the AQI thereof is from about 50 to about 65.

13. A method for preparing frangible catalyst support agglomerate particles which comprises:
   (A) dry milling inorganic oxide selected from the group consisting of $SiO_2$, $Al_2O_3$, $MgO$, $AlPO_4$, $TiO_2$, $ZrO_2$, $Cr_2O_3$, and mixtures thereof, in a manner and under conditions sufficient to form powder having an average particle size of from about 2 to about 10 microns and a moisture content of less than about 50% by weight, based on the powder weight;
   (B) optionally, wet milling an aqueous slurry of inorganic oxide selected from the group consisting of $SiO_2$, $Al_2O_3$, $MgO$, $AlPO_4$, $TiO_2$, $ZrO_2$, $Cr_2O_3$, and mixtures thereof, in a manner and under conditions sufficient to impart an average particle size of from about 3 to about 10 microns, and a particle size distribution such that from about 2 to about 40 weight % of the solid material possesses a colloidal particle size;
   (C) providing an aqueous slurry comprising a dry milled powder solids prepared in accordance with step (A), and optionally wet milled solids prepared in accordance with step (B), (D) controlling, in the slurry of (C), the wet milled:dry milled component dry solids weight ratio, the total weight % solids, and the slurry pH in a manner sufficient to produce catalyst support agglomerate particles possessing the below described properties, when the slurry is spray dried; and (E) spray drying the slurry of (C) having controlled weight % solids, pH, and component solids ratio in a manner and under conditions sufficient to produce catalyst support agglomerate particles having the following properties:

(i) at least 80% of the volume of the agglomerated particles smaller than the $D_{90}$ of the entire agglomerate particle size distribution possesses a microspheroidal morphology; and, (ii) the microspheroidal support agglomerate particles possess:

(a) a surface having a rough, scabrous appearance;

(b) interstitial void spaces having a substantially uniform size and distribution within said agglomerate with at least some of the interstitial void spaces penetrating the agglomerate surface thereby providing at least 10 channels from the agglomerate surface to the agglomerate particle interior;

iii) an average IVS of from about 15 to about 40%;

(iv) the support agglomerate particles possess:

(a) an average particle size in the range of about 1 to about 250 microns;

(b) a surface area of from about 1 to about 1000 m² per gram; and (c) an AQI of from about 20 to about 65.

14. The method of claim 13, wherein in the slurry to be spray dried:

(A) the wet milled:dry milled component solids weight ratio of the slurry to be spray dried is <1:1;

(B) the pH of the slurry to be spray dried is controlled to be from about 6 to about 9; and (C) the total dry solids content of the slurry to be spray dried is controlled to be from about 10 to about 20 weight %, based on the slurry weight.

15. The method of claim 13, wherein in the slurry to be spray dried:

(A) the wet milled:dry milled component solids weight ratio of the slurry to be spray dried is greater than about 1:1;

(B) the pH of the slurry to be spray dried is controlled to be from about 3 to about 6; and (C) the total dry solids content of the slurry to be spray dried is controlled to be from about 10 to about 20 weight %, based on the slurry weight.

16. The method of claim 13, wherein the milling steps are controlled to impart a particle size Distribution Span, to the solids content of the slurry to be spray dried, of from about 0.5 to about 3.

17. The method of claim 13, wherein the inorganic oxide comprises at least 80 weight percent silica gel.

18. The method of any one of claims 13 to 17, wherein spray drying is controlled to impart an AQI to the spray dried product of from about 30 to about 65.

19. The method of any one of claims 13 to 17, wherein spray drying is controlled to impart an AQI to the spray dried product of from about 40 to about 65.

20. The method of claim 13, wherein the spray dried product is calcined at a temperature of from about 150 to about 850° C. for a period of from about 1 to about 600 minutes.

21. The method of claim 20, wherein calcination is conducted in a calciner selected from the group consisting of a rotary calciner, fixed bed oven, and multiple hearth furnace.

22. The method of claim 20, wherein the calcined support is impregnated with at least one catalyst component of a catalyst system capable of polymerizing olefins.

23. The method of claim 22, wherein the catalyst component is part of a catalyst system selected from the group consisting of Ziegler-Natta, metallocene, and Ni or Pd based catalysts.

24. The method of any one of claims 22 or 23, wherein impregnation is conducted using an organic solvent.

25. The method of claim 24, wherein the organic solvent is evaporated in a conical dryer.

* * * * *

UNITED STATES PATENT AND TRADEMARK OFFICE
CERTIFICATE OF CORRECTION

PATENT NO. : 6,329,315 B1
DATED : December 11, 2001
INVENTOR(S) : Denton et al.

It is certified that error appears in the above-identified patent and that said Letters Patent is hereby corrected as shown below:

Column 27,
Line 14, "80" should not be superscript
Line 21, "leaving" should be -- having --

Column 28,
Line 4, "weight based," should be -- weight, based --
Line 19, "a average" should be -- an average --

Signed and Sealed this

Twenty-first Day of May, 2002

JAMES E. ROGAN
*Director of the United States Patent and Trademark Office*

*Attest:*

*Attesting Officer*